US012781540B2

(12) United States Patent
Chen et al.

(10) Patent No.: US 12,781,540 B2
(45) Date of Patent: Nov. 3, 2026

(54) SLIDE RAIL MECHANISM

(71) Applicants: KING SLIDE WORKS CO., LTD., Kaohsiung City (TW); KING SLIDE TECHNOLOGY CO.,LTD., Kaohsiung City (TW)

(72) Inventors: Ken-Ching Chen, Kaohsiung City (TW); Shun-Ho Yang, Kaohsiung City (TW); Chi-Chih Chou, Kaohsiung City (TW); Chun-Chiang Wang, Kaohsiung City (TW)

(73) Assignees: KING SLIDE WORKS CO., LTD., Kaohsiung City (TW); KING SLIDE TECHNOLOGY CO., LTD., Kaohsiung City (TW)

( * ) Notice: Subject to any disclaimer, the term of this patent is extended or adjusted under 35 U.S.C. 154(b) by 35 days.

(21) Appl. No.: 19/079,390

(22) Filed: Mar. 13, 2025

(65) Prior Publication Data

US 2026/0130506 A1 May 14, 2026

(30) Foreign Application Priority Data

Nov. 12, 2024 (TW) ................................ 113143588

(51) Int. Cl.
*E05B 65/46* (2017.01)
*A47B 88/49* (2017.01)
(Continued)

(52) U.S. Cl.
CPC ............ *E05B 65/463* (2013.01); *A47B 88/49* (2017.01); *A47B 88/50* (2017.01); *E05B 65/464* (2013.01); *A47B 88/473* (2017.01)

(58) Field of Classification Search
CPC .... E05B 65/463; E05B 65/464; E05B 65/462; A47B 88/49; A47B 88/50; A47B 88/473;
(Continued)

(56) References Cited

U.S. PATENT DOCUMENTS 2,240,067 A 4/1941 Bolesky
3,404,929 A 10/1968 Wright
(Continued)

FOREIGN PATENT DOCUMENTS

DE 20 2011 052 524 U1 2/2012
GB 2063355 A * 6/1981 ........... E05B 65/463
(Continued)

*Primary Examiner* — Kimberley S Wright
(74) *Attorney, Agent, or Firm* — Winston Hsu

(57) ABSTRACT

A slide rail mechanism is provided and includes a first slide rail assembly, a second slide rail assembly and a locking member. Each of the first slide rail assembly and the second slide rail assembly includes a first rail and a second rail. The second rails of the first slide rail assembly and the second slide rail assembly are displaceable relative to the corresponding first rails, respectively, from a retracted position to a working position by a predetermined distance in an opening direction. When the second rail of the first slide rail assembly is displaced from the retraced position or the working position in the opening direction, the locking member is driven to move from a first predetermined position to a second predetermined position to prevent the second rail of the second slide rail assembly from displacing from the working position in the opening direction.

17 Claims, 17 Drawing Sheets

(51) Int. Cl.

| | |
|---|---|
| ***A47B 88/50*** | (2017.01) |
| ***E05B 65/463*** | (2017.01) |
| ***E05B 65/464*** | (2017.01) |
| *A47B 88/473* | (2017.01) |

(58) Field of Classification Search
CPC ............ A47B 88/477; A47B 2210/007; A47B 2210/0064
See application file for complete search history.

(56) References Cited

U.S. PATENT DOCUMENTS

| | | | | |
|---|---|---|---|---|
| 3,888,558 A | | 6/1975 | Himsl | |
| 6,634,726 B1 | * | 10/2003 | Slivon | E05B 65/463 312/217 |
| 6,722,749 B1 | | 4/2004 | Pagac | |
| 2005/0023941 A1 | * | 2/2005 | Chiu | E05B 65/464 312/221 |
| 2007/0164644 A1 | * | 7/2007 | Hwang | A47B 88/49 312/333 |
| 2007/0176523 A1 | * | 8/2007 | Lin | B25H 3/028 312/218 |
| 2008/0054768 A1 | * | 3/2008 | Lin | E05B 65/463 312/221 |
| 2012/0187816 A1 | * | 7/2012 | Chen | E05B 65/463 312/334.8 |
| 2024/0263489 A1 | * | 8/2024 | Chen | E05B 65/463 |
| 2025/0213040 A1 | * | 7/2025 | Chen | A47B 88/49 |
| 2025/0366611 A1 | * | 12/2025 | Chen | A47B 88/443 |

FOREIGN PATENT DOCUMENTS

| | | |
|---|---|---|
| JP | 3173757 | 2/2012 |
| JP | 2017-76770 | 4/2017 |
| JP | 2024-163836 | 11/2024 |

* cited by examiner

SLIDE RAIL MECHANISM

BACKGROUND OF THE INVENTION

1. Field of the Invention

The present invention relates to a slide rail product, and more specifically, to a slide rail mechanism with an interlock function.

2. Description of the Prior Art

In U.S. Pat. No. 3,888,558, it discloses an interlock mechanism adapted for a cabinet body. A plurality of drawers are arranged on the cabinet body and supported by a plurality of slide rail assemblies, respectively. Each of the plurality of slide rail assemblies includes a fixed rail fixed on the cabinet body and a movable rail configured to support the corresponding drawer. The interlock mechanism includes a locking rod movable relative to the cabinet body. A plurality of rolling members are arranged on the locking rod. A guiding member is disposed on a lateral side of each of the drawers, and the guiding member includes an inclined protruding block portion and a blocking portion located under the inclined protruding block portion. When one of the drawers is opened, the inclined protruding block portion of the guiding member on the one of the drawers abuts against the corresponding rolling member to drive the locking rod to move from an unlocking position to a locking position, thereby enabling the blocking portions of the other guiding members to block the other rolling members to prevent the other drawers from being opened.

In U.S. Pat. No. 3,404,929, it discloses a storage system with an interlock function. Similar to U.S. Pat. No. 3,888,558, in the storage system of U.S. Pat. No. 3,404,929, a cam assembly is arranged on each of a plurality of drawers and configured to cooperate with a locking rod. When one of the drawers is opened, the cam assemblies on the other drawers are blocked by corresponding protruding objects on the locking rod, respectively, thereby preventing the other drawers from being opened.

In U.S. Pat. No. 6,722,749 B1, it discloses a drawer open position controller having a housing, a plurality of drawers arranged on the housing, and a drawer lock. The drawer lock includes a plurality of ramps, a plurality of followers and a plurality of blocking devices. The ramps and the blocking devices protrude from a linking bar. When one of the drawers is opened from a retracted position to an opened position, e.g., a fully opened position, in an opening direction, the follower on the one of the drawers moves along a guiding path between the corresponding ramp and the corresponding blocking device, and the corresponding blocking device is supported by a support to maintain a position of the linking bar to enable the other blocking devices to block the followers on the other drawers. Accordingly, the other drawers are only allowed to be opened from the retraced position to a predetermined position, e.g., a semi-opened position.

However, in order to meet different requirements, it becomes an important topic to provide a different slide rail product with an interlock function.

SUMMARY OF THE INVENTION

It is an objective of the present invention to provide a slide rail mechanism with an interlock function.

According to an aspect of the present invention, a slide rail mechanism includes a first slide rail assembly, a second slide rail assembly, a first working device, a second working device and a locking member. Each of the first slide rail assembly and the second slide rail assembly includes a first rail and a second rail displaceable relative to the first rail. The first working device is arranged on the second rail of the first slide rail assembly. The first working device includes a first working member and a first predetermined track. The second working device is arranged on the second rail of the second slide rail assembly. The second working device includes a second working member and a second predetermined track. The locking member is movable relative to the first rail of each of the first slide rail assembly and the second slide rail assembly. The first auxiliary feature is arranged on the locking member. The second auxiliary feature is arranged on the locking member. When the second rail of each of the first slide rail assembly and the second slide rail assembly is located at a retracted position relative to the first rail of each of the first slide rail assembly and the second slide rail assembly, the first auxiliary feature and the second auxiliary feature are spaced apart from the first working device and the second working device, respectively, by a predetermined distance. The second rail of each of the first slide rail assembly and the second slide rail assembly is displaceable from the retracted position to a working position by the predetermined distance relative to the first rail of each of the first slide rail assembly and the second slide rail assembly in an opening direction. When the second rail of the first slide rail assembly is displaced from the working position relative to the first rail of the first slide rail assembly in the opening direction, the first working member of the first working device is configured to abut against the first auxiliary feature for driving the locking member to move from a first predetermined position to a second predetermined position, and the first predetermined track of the first working device is configured to support the locking member for maintaining the locking member at the second predetermined position. When the locking member is located at the second predetermined position, the second auxiliary feature is configured to block the second working member to prevent the second rail of the second slide rail assembly from displacing from the working position relative to the first rail of the second slide rail assembly in the opening direction.

According to another aspect of the present invention, a slide rail mechanism is adapted for a rack. The slide rail mechanism includes a first slide rail assembly, a second slide rail assembly, a first working device, a second working device, a locking member, a first auxiliary feature and a second auxiliary feature. The first slide rail assembly is configured to be mounted on the rack. The second slide rail assembly is configured to be mounted on the rack. Each of the first slide rail assembly and the second slide rail assembly includes a first rail and a second rail displaceable relative to the first rail. The second rail of each of the first slide rail assembly and the second slide rail assembly is configured to support an electronic apparatus. The first working device is arranged on the second rail of the first slide rail assembly. The first working device includes a first working member. The second working device is arranged on the second rail of the second slide rail assembly. The second working device includes a second working member. The locking member is movable relative to the rack. The first auxiliary feature is arranged on the locking member. The second auxiliary feature is arranged on the locking member. When the second rail of each of the first slide rail assembly and the second slide rail assembly is located at a retracted position relative to the first rail of each of the first slide rail assembly and the second slide rail assembly, the first auxiliary feature and the second auxiliary feature are spaced apart from the first working device and the second working device, respectively, by a predetermined distance. The second rail of each of the first slide rail assembly and the second slide rail assembly is displaceable from the retracted position to a working position by the predetermined distance relative to the first rail of each of the first slide rail assembly and the second slide rail assembly in an opening direction. When the second rail of the first slide rail assembly is displaced from the working position relative to the first rail of the first slide rail assembly in the opening direction, the first working member of the first working device is configured to abut against the first auxiliary feature for driving the locking member to move from a first predetermined position to a second predetermined position. When the locking member is located at the second predetermined position, the second auxiliary feature is configured to block the second working member to prevent the second rail of the second slide rail assembly from displacing from the working position relative to the first rail of the second slide rail assembly in the opening direction.

In summary, in the present invention, when the second rail of one of the first slide rail assembly and the second slide rail assembly is displaced in the opening direction, the locking member can be driven to move from the first predetermined position to the second predetermined position to prevent the second rail of the other one of the first slide rail assembly and the second slide rail assembly from being displaced from the working position in the opening direction.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is connected to a second device, that connection may be through a direct mechanical connection, or through an indirect mechanical connection via other devices and connections.

Figure 1:
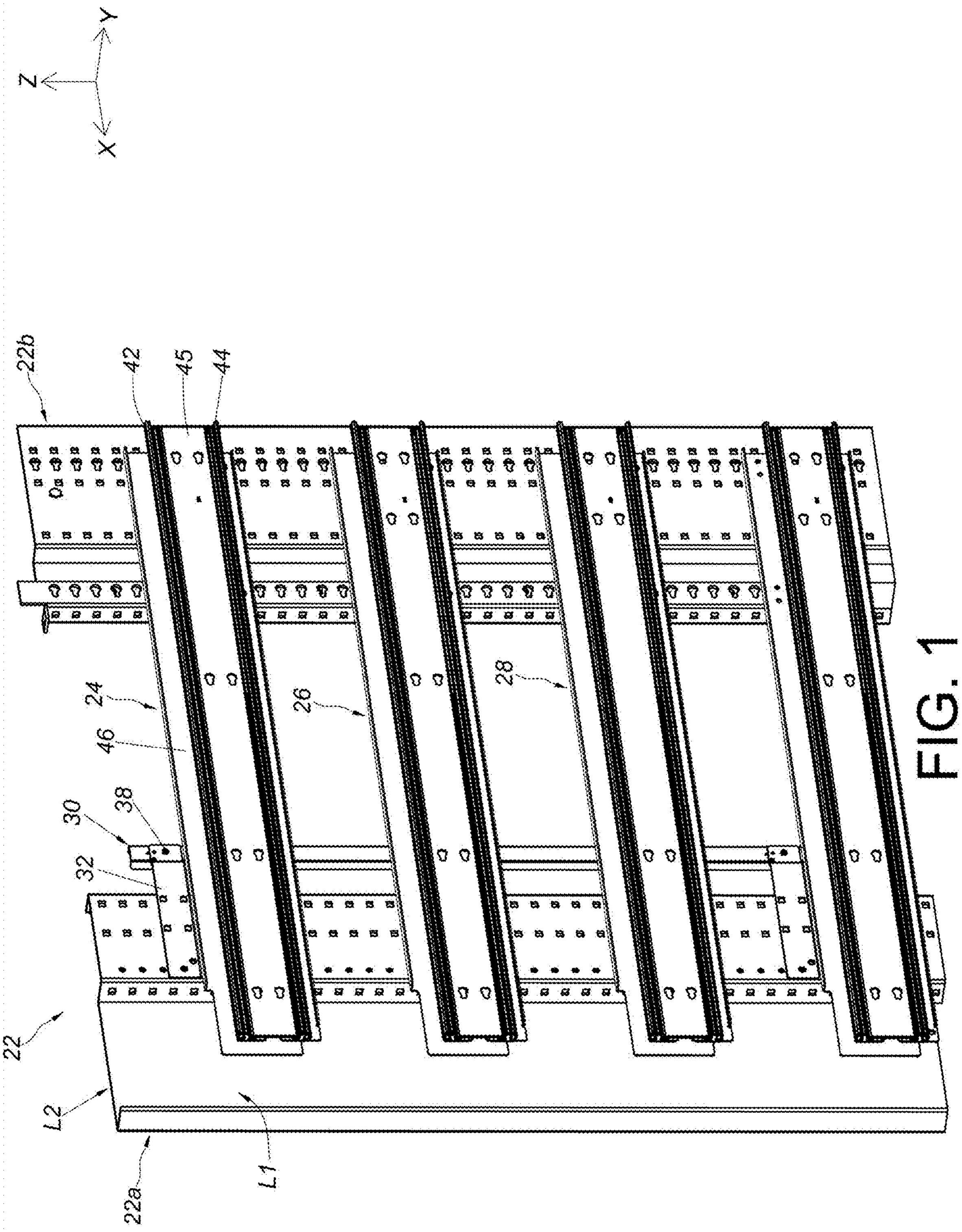
FIG. 1 is a schematic diagram of a slide rail mechanism adapted for a rack from a first perspective according to a first embodiment of the present invention.
Figure 2:
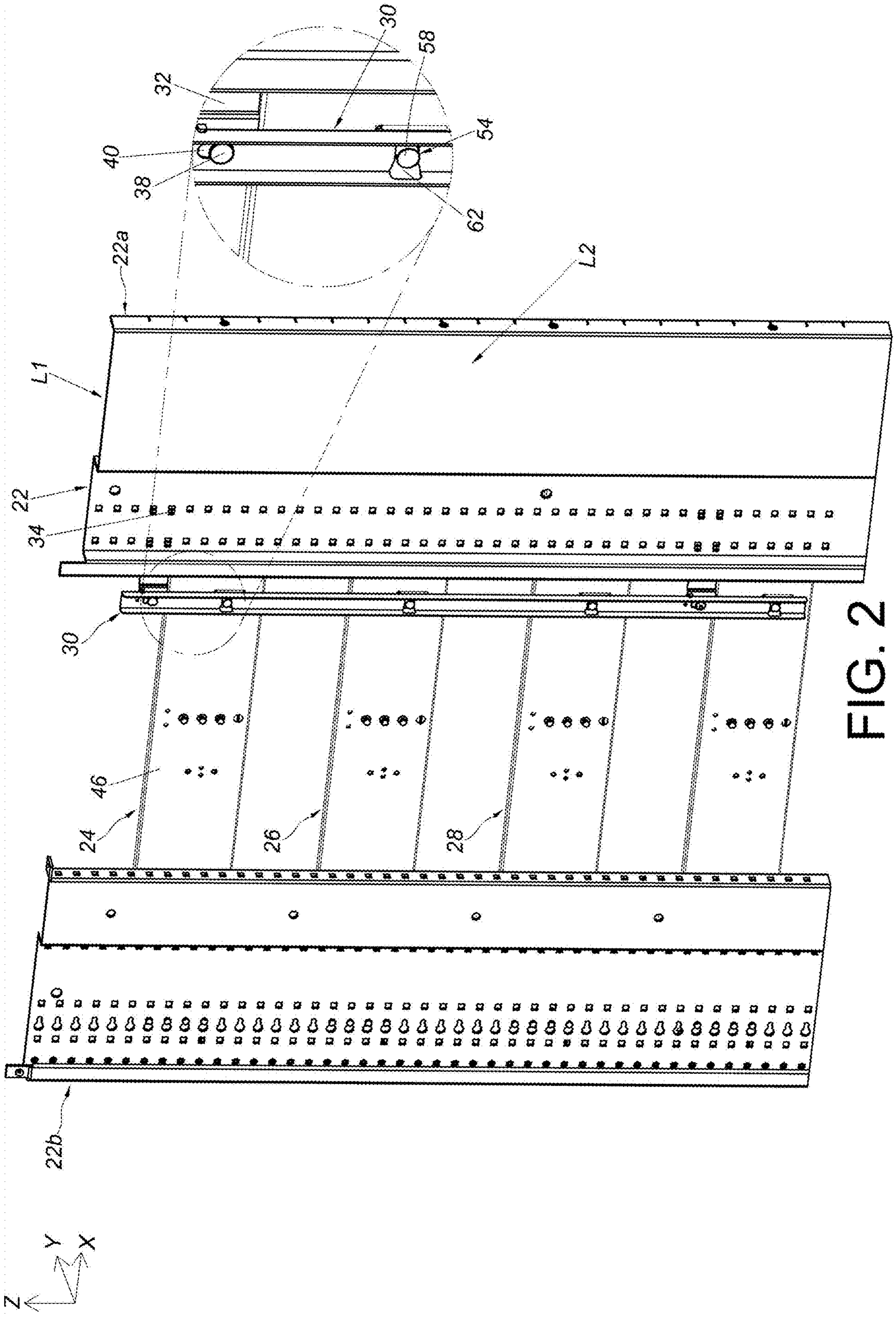
FIG. 2 is a schematic diagram of the slide rail mechanism adapted for the rack from a second perspective according to the first embodiment of the present invention.

As shown in FIG. 1 and FIG. 2, in a first embodiment, a slide rail mechanism is configured to be mounted on a wall or a post of a rack 22. The rack 22 includes a first post portion **22*a* and a second post portion 22*b*. For example, the first post portion 22*a* and the second post portion 22*b* of the rack 22 can be a front post portion and a rear post portion of the rack 22, respectively. The slide rail mechanism includes a plurality of slide rail assemblies and a locking member 30. In this embodiment, by way of example, the plurality of slide rail assemblies includes a first slide rail assembly 24, a second slide rail assembly 26 and a third slide rail assembly 28. The wall of the rack 22 includes a first side L1 and a second side L2 opposite to the first side L1. For example, the first side L1 and the second side L2 of the wall of the rack 22 can be an inner side and an outer side of the wall of the rack 22. The first slide rail assembly 24, the second slide rail assembly 26 and the third slide rail assembly 28 are configured to be mounted on the rack 22, e.g., on the first side L1 of the wall of the rack 22. The first slide rail assembly 24, the second slide rail assembly 26 and the third slide rail assembly 28 can have substantially identical structures, and the first slide rail assembly 24, the second slide rail assembly 26 and the third slide rail assembly 28 can be arranged at intervals in a height direction of the rack 22** sequentially from top to bottom.

The locking member 30 is movable relative to the rack 22. In this embodiment, by way of example, the locking member 30 is movably mounted on the rack 22. However, the present invention is not limited to this embodiment.

Preferably, the locking member 30 is a rod structure oriented parallel to the height direction of the rack 22 (a Z axis).

Preferably, the locking member 30 is detachably mounted on the rack 22. For example, the locking member 30 can be mounted on the rack 22 by a mounting member 32. In this embodiment, by way of example, as shown in FIG. 2, the mounting member 32 includes at least one mounting feature 34 configured to engage with at least one corresponding feature of the first post portion 22*a* of the rack 22. One of the mounting feature 34 and the corresponding feature is a protruding portion, and the other one of the mounting feature 34 and the corresponding feature is a mounting hole. However, the present invention is not limited to this embodiment. For example, in another embodiment, the mounting member 32 can be a fastening member, such as a screw member or a bolt member or any other threaded member, configured to be fastened on the first post portion 22*a* of the rack 22.

Preferably, a first restraining feature 38 is arranged on one of the rack 22 and the mounting member 32. In this embodiment, by way of example, as shown in FIG. 2, the first restraining feature 38 is arranged on the mounting member 32, and a second restraining feature 40 is arranged on the locking member 30 and configured to cooperate with the first restraining feature 38 to restrict movement of the locking member 30 relative to the rack 22 within a limited range. Besides, as shown in FIG. 2, one of the first restraining feature 38 and the second restraining feature 40 is a protruding object, and the other one of the first restraining feature 38 and the second restraining feature 40 is an elongated hole oriented parallel to the height direction of the rack 22, wherein the protruding object passes through a portion of the elongated hole.

Figure 3:
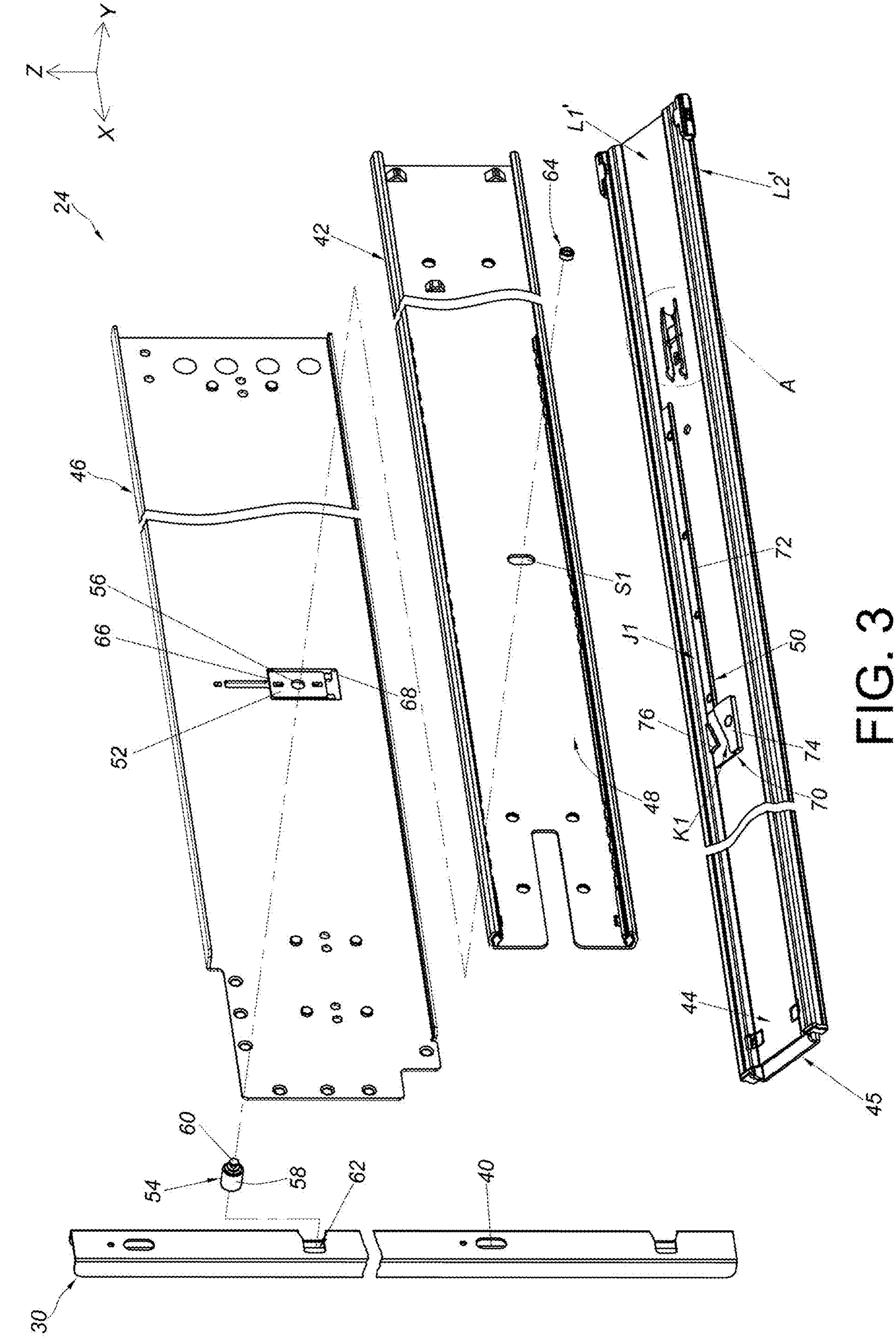
FIG. 3 is an exploded diagram of the slide rail mechanism according to the first embodiment of the present invention.

As shown in FIG. 3, the structural relationship between the rack 22 and the first slide rail assembly 24 is substantially identical to the structural relationship between the rack 22 and the second slide rail assembly 26 and the structural relationship between the rack 22 and the third slide rail assembly 28. Detailed description for the structural relationship between the rack 22 and the first slide rail assembly 24 is provided as an example for simplicity. Specifically, the first slide rail assembly 24 includes a first rail 42 and a second rail 44 displaceable relative to the first rail 42 in a longitudinal direction. Preferably, the first slide rail assembly 24 further includes a third rail 45, and the second rail 44 is movably mounted between the first rail 42 and the third rail 45. In this embodiment, by way of example, the first rail 42, the second rail 44 and the third rail 45 are an outer rail, a middle rail and an inner rail, respectively. Furthermore, in this embodiment, by way of example, the longitudinal direction can be defined by a length direction or a displacing direction of a slide rail, e.g., the first rail 42, the second rail 44 or the third rail 45, and parallel to an X axis. A transverse direction can be defined by a lateral direction or a width direction of the slide rail, e.g., the first rail 42, the second rail 44 or the third rail 45, and parallel to a Y axis. A vertical direction can be defined by a height direction of the slide rail, e.g., the first rail 42, the second rail 44 or the third rail 45, or the height direction of the rack 22, and parallel to the Z axis.

Furthermore, the first rail 42 is mounted on the rack 22. In this embodiment, by way of example, as shown in FIG. 1, the first rail 42 is mounted on the rack 22 by a bracket 46. The bracket 46 is configured to be attached or fixed onto the first rail 42 and therefore can be considered as a part of the first rail 42 structurally. Besides, the first rail 42 includes a channel 48 configured to receive the second rail 44, and the third rail 45 is configured to support an carried object, such as an electronic apparatus or a drawer, which is not shown in the figure. The second rail 44 includes a first side L1' and a second side L2' opposite to the first side L1'. The first side L1' of the second rail 44 faces toward or is located adjacent to the first rail 42, and the second side L2' of the second rail 44 faces toward or is located adjacent to the third rail 45.

The slide rail mechanism further includes a first working device 50 arranged on the first side L1' of the second rail 44 of the first slide rail assembly 24. Besides, a movable member 52 is movably mounted on the bracket 46. The structural relationship between the locking member 30 and the first slide rail assembly 24 is substantially identical to the structural relationship between the locking member 30 and the second slide rail assembly 26 and the structural relationship between the locking member 30 and the third slide rail assembly 28. Detailed description for the structural relationship between the locking member 30 and the first slide rail assembly 24 is provided as an example for simplicity. Specifically, the movable member 52 is movable relative to the bracket 46 in the height direction (the Z axis). Preferably, the slide rail mechanism further includes a first auxiliary feature 54 arranged on the locking member 30, and the first rail 42 of the first slide rail assembly 24 includes a first space S1. In this embodiment, by way of example, the first space S1 is an extending hole oriented parallel to the height direction. However, the present invention is not limited to this embodiment. The first auxiliary feature 54 is configured to pass through a predetermined hole 56 of the movable member 52 and a portion of the first space S1 sequentially, so as to cooperate with the first working device 50 arranged on the second rail 44 of the first slide rail assembly 24.

Preferably, in this embodiment, by way of example, the first auxiliary feature 54 is a positioning pin or a column-shaped structure. However, the present invention is not limited to this embodiment. The first auxiliary feature 54 includes a first extending portion 58 with a first dimension, and a second extending portion 60 with a second dimension less than the first dimension and connected to the first extending portion 58. As shown in FIG. 2, the first extending portion 58 is configured to be connected to the locking member 30 and partially located within a corresponding space 62 of the locking member 30, and the second extending portion 60 is configured to pass through the predetermined hole 56 of the movable member 52 and a portion of the first space S1 sequentially. Besides, the second extending portion 60 further includes a rolling portion 64 arranged on the second extending portion 60 and configured to cooperate with the first working device 50.

Preferably, a first restraining portion 66 and a second restraining portion 68 are arranged on the bracket 46 for restricting movement of the movable member 52 in the height direction, and the movable member 52 is located between the bracket 46 and the first rail 42.

Preferably, the first working device 50 includes a first working member 70 and a first predetermined track 72. The first working member 70 includes a first portion 74 and a second portion 76. A first guiding path K1 is formed between the first portion 74 and the second portion 76 of the first working member 70 and communicated with a first supporting path J1 formed on the first predetermined track 72.

Figure 4:
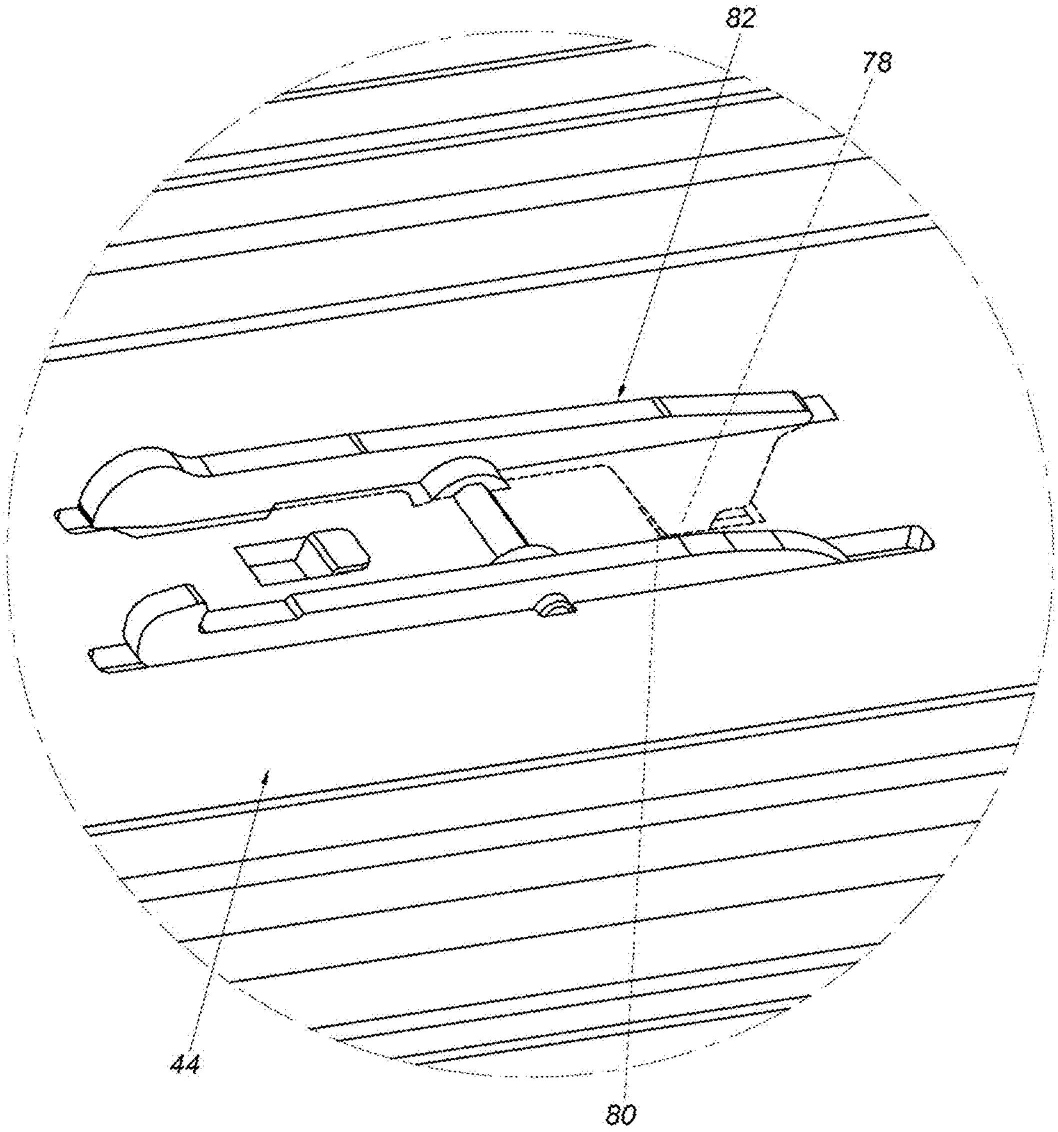
FIG. 4 is an enlarged diagram of an A portion of the slide rail mechanism shown in FIG. 3 according to the first embodiment of the present invention.

As shown in FIG. 3 and FIG. 4, the second rail 44 and the third rail 45 includes a first predetermined feature 78 and a second predetermined feature 80, respectively. The first predetermined feature 78 is configured to engage with the second predetermined feature 80 to drive the third rail 45 to displace synchronously with the second rail 44. In this embodiment, by way of example, an engaging member 82 is movably mounted on, e.g., pivotally connected to, the second rail 44, the first predetermined feature 78 is an engaging hook formed on the engaging member 82, and the second predetermined feature 80 is a hole wall of a hole structure formed on the third rail 45 and configured to be engaged with the first predetermined feature 78. It should be noticed that, when the third rail 45 and the second rail 44 are displaced synchronously relative to the first rail 42 by a preset distance, a disengaging structure on the first rail 42 is configured to disengage the first predetermined feature 78 and the second predetermined feature 80 from each other for terminating a synchronous displacement of the third rail 45 and the second rail 44.

Figure 5:
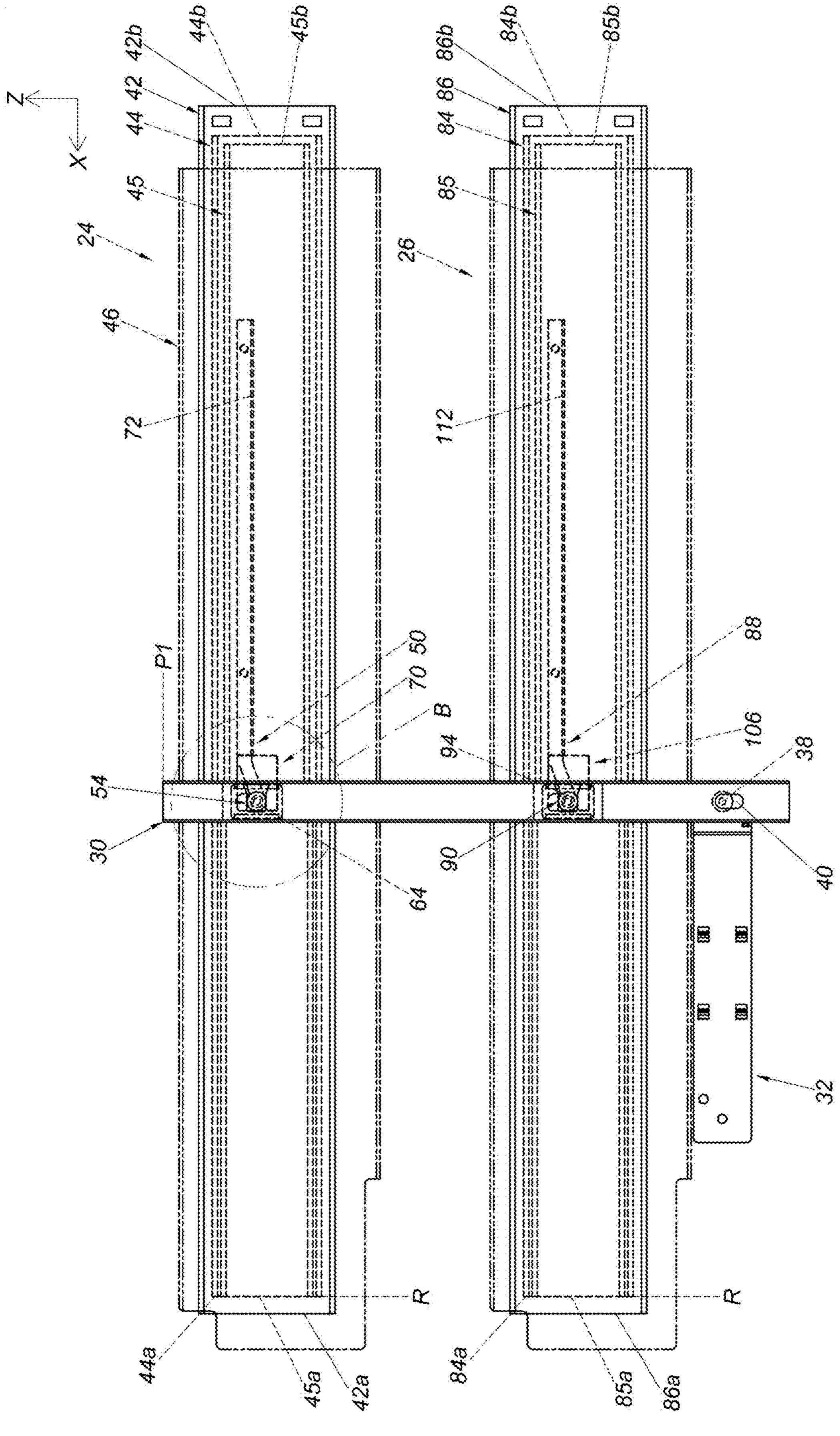
FIG. 5 is a diagram of the slide rail mechanism with a locking member at a first predetermined position according to the first embodiment of the present invention.

As shown in FIG. 5, the locking member 30 is only allowed to move relative to the rack 22 within the limited range in the height direction (the Z axis) by a cooperation of the first restraining feature 38 and the second restraining feature 40.

Furthermore, when the slide rail mechanism is in a state as shown in FIG. 5, both the first slide rail assembly 24 and the second slide rail assembly 26 are in a retracted state, and the locking member 30 is located at a first predetermined position P1. In other words, at this moment, both the second rail 44 and the third rail 45 of the first slide rail assembly 24 are located at a retracted position R relative to the first rail 42 of the first slide rail assembly 24, and both a second rail 84 and a third rail 85 of the second slide rail assembly 26 are located at the retracted position R relative to a first rail 86 of the second slide rail assembly 26. Preferably, when both the second rail 44 and the third rail 45 of the first slide rail assembly 24 are located at the retracted position R relative to the first rail 42 of the first slide rail assembly 24, a front end 44*a* of the second rail 44 and a front end 45*a* of the third rail 45 of the first slide rail assembly 24 do not protrude out of a front end 42*a* of the first rail 42 of the first slide rail assembly 24. Similarly, when both the second rail 84 and the third rail 85 of the second slide rail assembly 26 are located at the retracted position R relative to the first rail 86 of the second slide rail assembly 26, a front end 84*a* of the second rail 84 and a front end 85*a* of the third rail 85 of the second slide rail assembly 26 do not protrude out of a front end 86*a* of the first rail 86 of the second slide rail assembly 26.

In addition to the first working device 50 arranged on the second rail 44 of the first slide rail assembly 24 and the first auxiliary feature 54 arranged on the locking member 30, the slide rail mechanism further includes a second working device 88 arranged on a first side of the second rail 84 of the second slide rail assembly 26, and a second auxiliary feature 90 arranged on the locking member 30 and configured to cooperate with the second working device 88. The second working device 88 and the first working device 50 have substantially identical structures. The second auxiliary feature 90 and the first auxiliary feature 54 have substantially identical structures. Detailed description for the second working device 88 and the second auxiliary feature 90 is omitted herein for simplicity.

Figure 6:
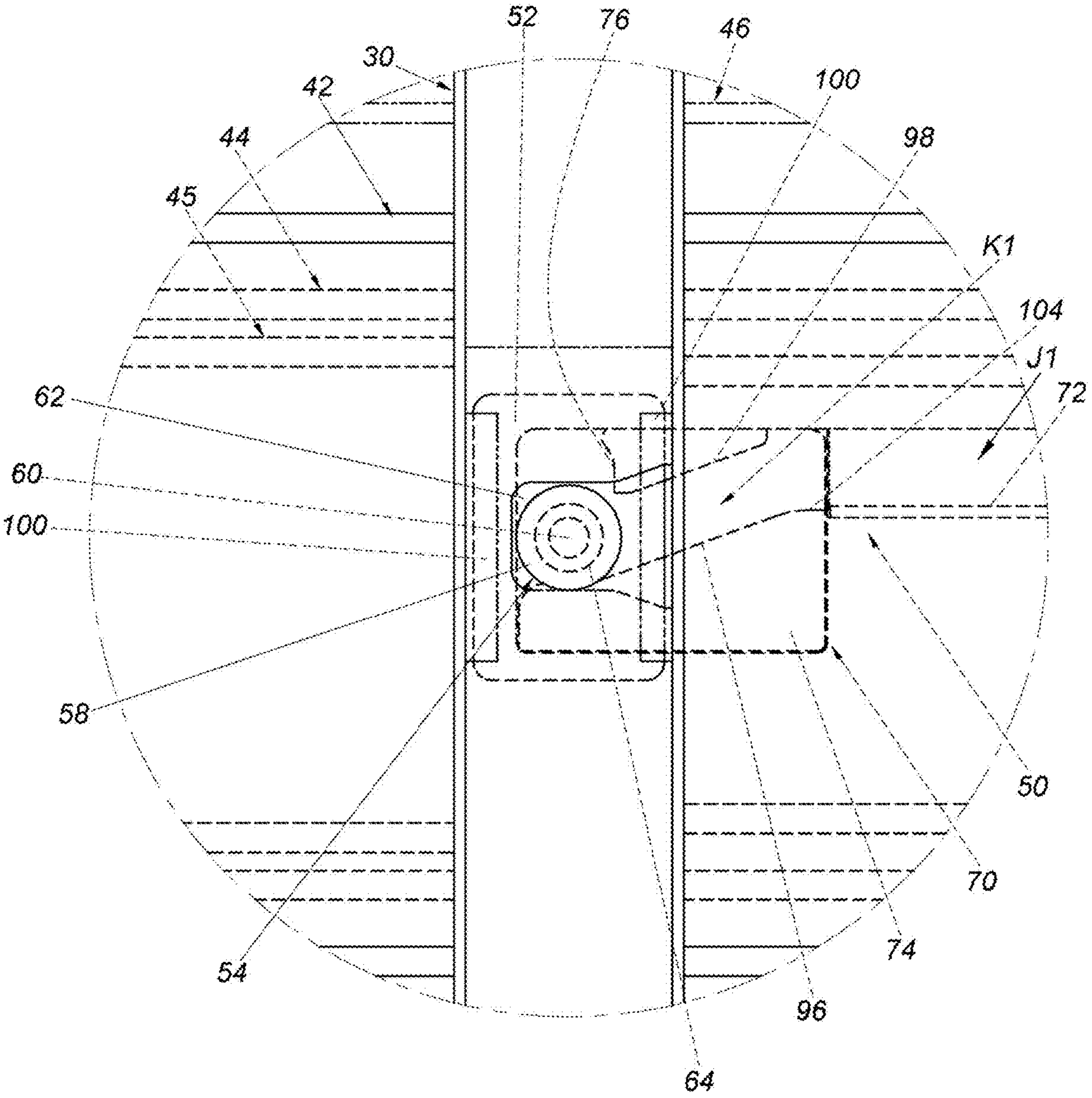
FIG. 6 is an enlarged diagram of a B portion of the slide rail mechanism shown in FIG. 5 according to the first embodiment of the present invention.

Furthermore, as shown in FIG. 6, the rolling portion 64 of the first auxiliary feature 54 is configured to cooperate with the first working device 50 on the second rail 44 of the first slide rail assembly 24, and a rolling portion 94 of the second auxiliary feature 90 is configured to cooperate with the second working device 88 on the second rail 84 of the second slide rail assembly 26.

As shown in FIG. 5 and FIG. 6, the structural relationship between the first working device 50 and the first auxiliary feature 54 are substantially identical to the structural relationship between the second working device 88 and the second auxiliary feature 90. Detailed description for the first working device 50 and the first auxiliary feature 54 is provided as an example for simplicity. The first portion 74 of the first working member 70 includes a first guiding section 96, and the second portion 76 of the first working member 70 includes a second guiding section 98 facing toward the first guiding section 96. In this embodiment, by way of example, the first guiding section 96 and the second guiding section 98 are inclined surfaces or arc surfaces. However, the present invention is not limited to this embodiment. The first guiding path K1 is formed between the first guiding section 96 of the first portion 74 and the second guiding section 98 of the second portion 76 of the first working member 70 and communicated with the first supporting path J1 formed on the first predetermined track 72. Besides, in this embodiment, by way of example, both the first predetermined track 72 and the first supporting path J1 formed on the first predetermined track 72 are oriented parallel to the length direction of the second rail 44, i.e., the longitudinal direction (the X axis).

Preferably, at least one guiding feature 100 is arranged on the bracket 46. In this embodiment, the at least one guiding feature 100 includes a pair of wing portions configured to support or hold the movable member 52 for enhancing moving stability of the movable member 52 relative to the bracket 46 in the height direction (the Z axis).

Figure 7:
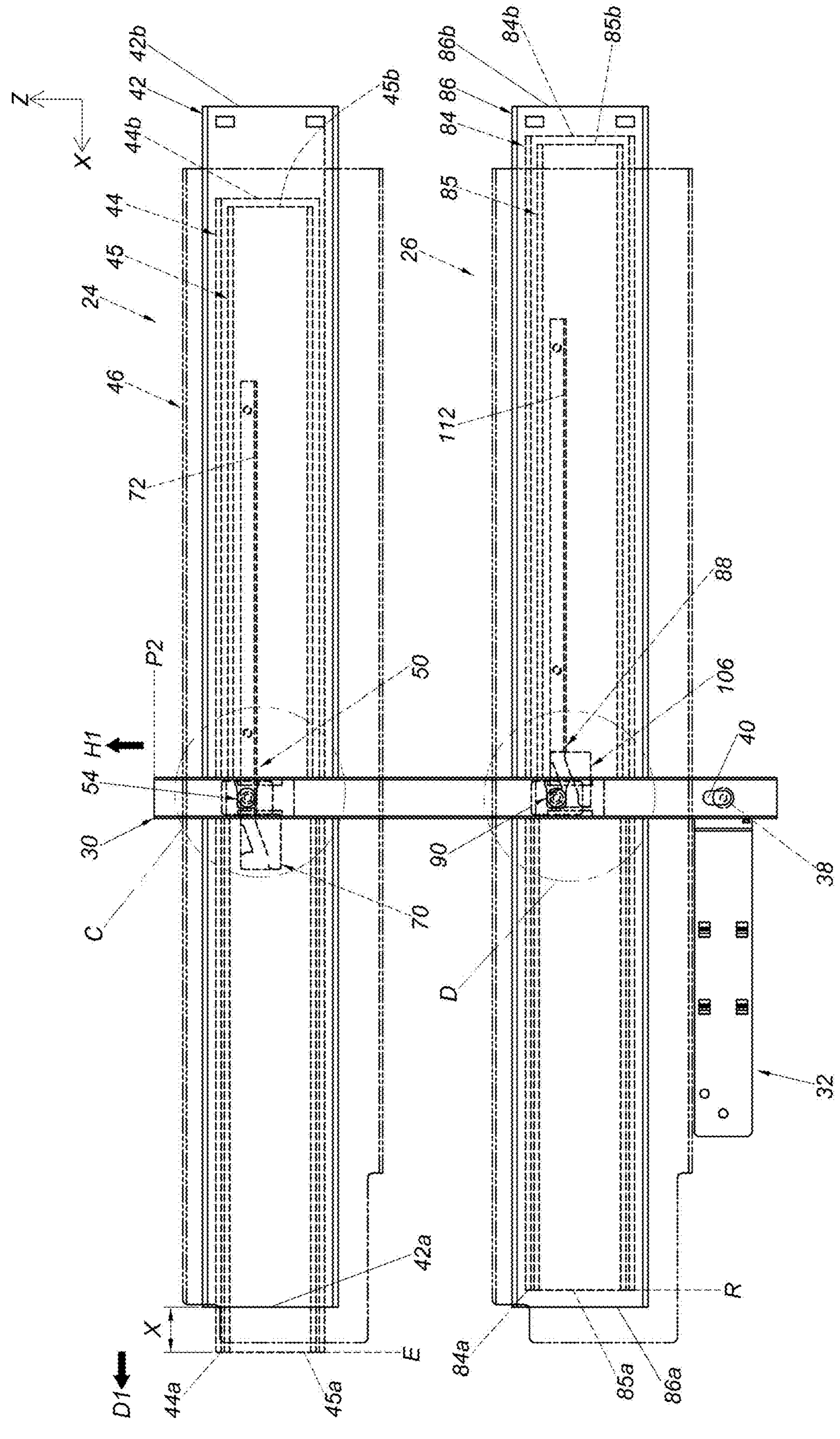
FIG. 7 is a diagram of the slide rail mechanism with a second rail of a first slide rail assembly displaced relative to a first rail of a first slide rail assembly in an opening direction and the locking member at a second predetermined position according to the first embodiment of the present invention.
Figure 8:
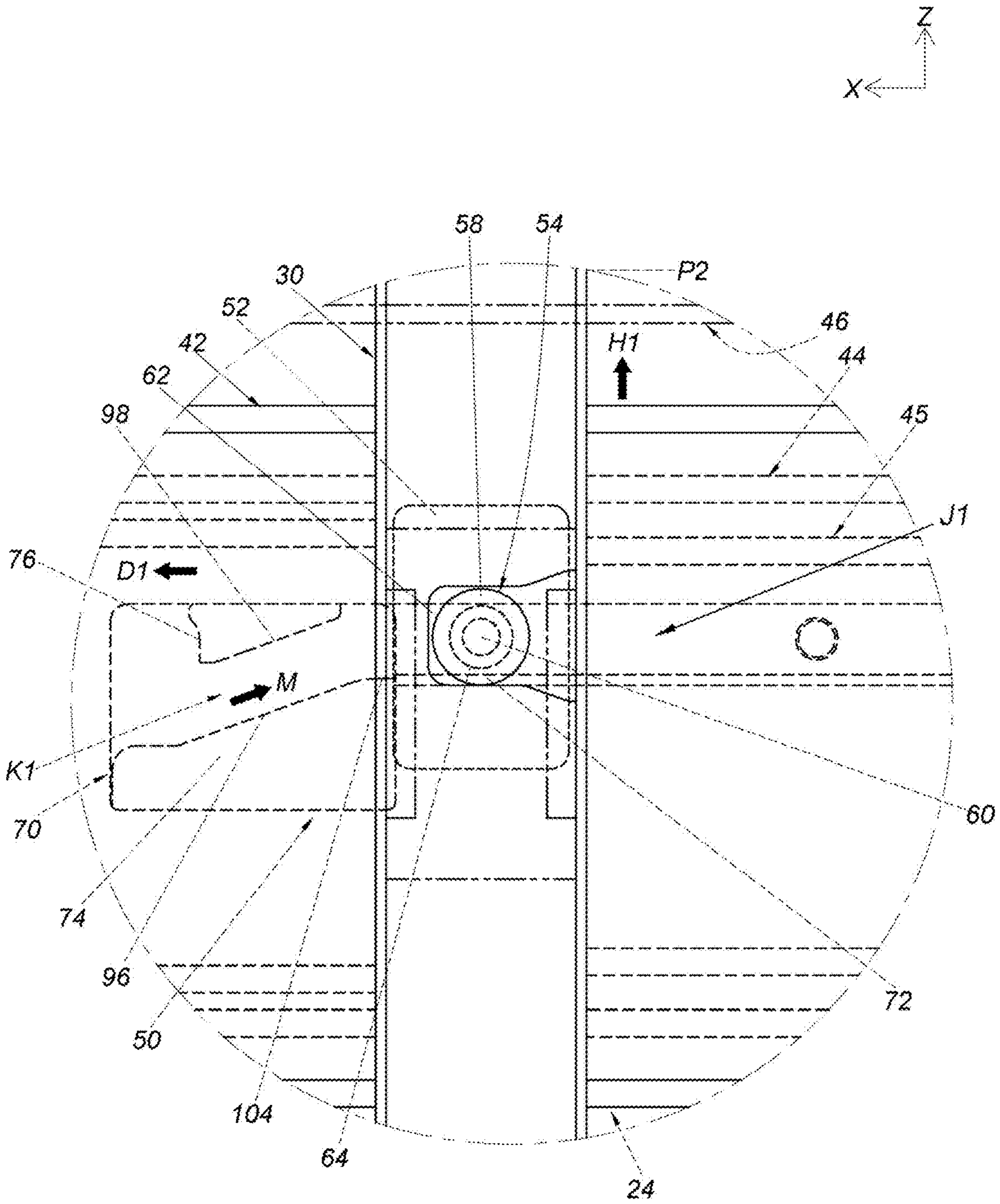
FIG. 8 is an enlarged diagram of a C portion of the slide rail mechanism shown in FIG. 7 according to the first embodiment of the present invention.
Figure 9:
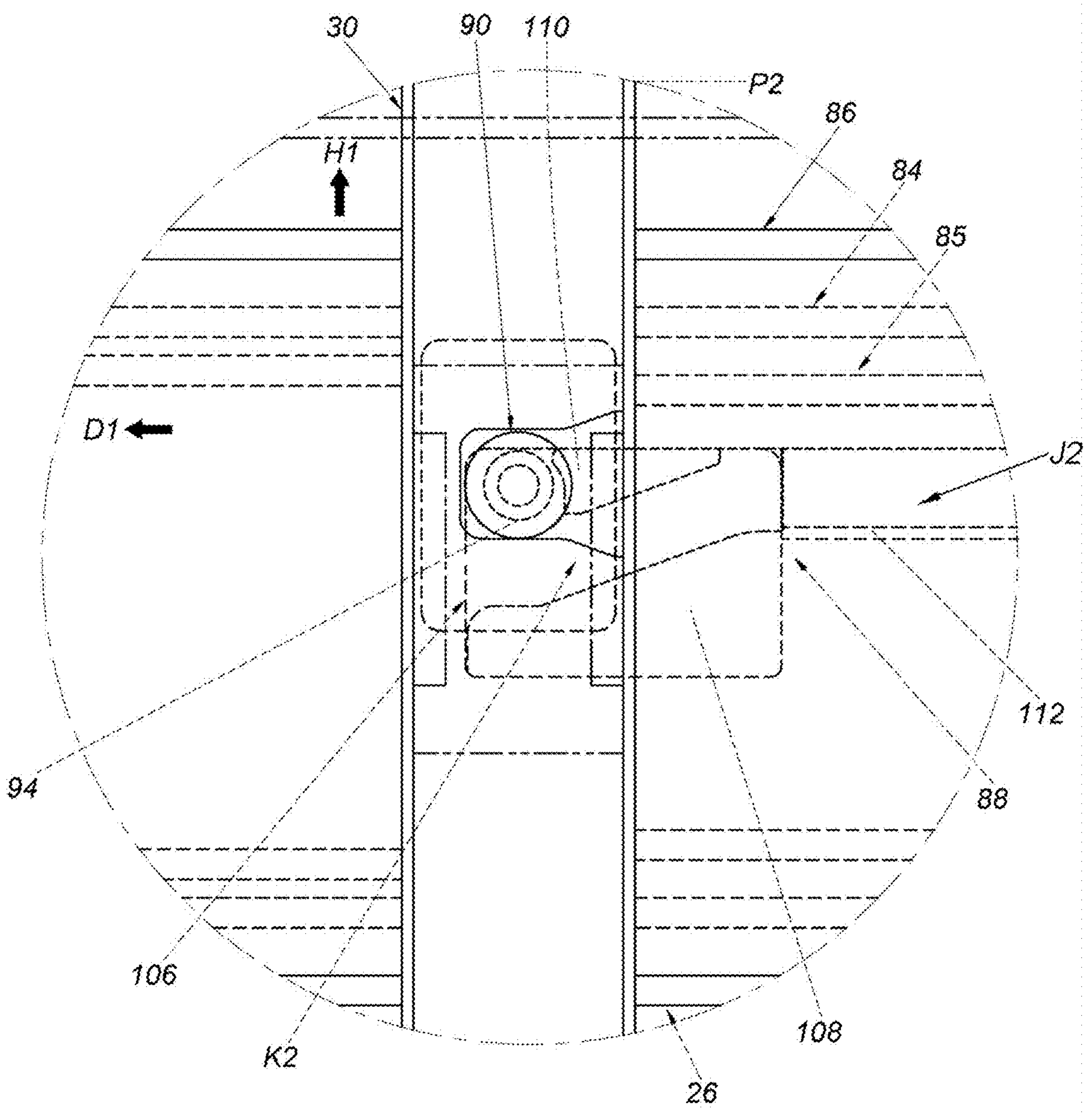
FIG. 9 is an enlarged diagram of a D portion of the slide rail mechanism shown in FIG. 7 according to the first embodiment of the present invention.

As shown in FIG. 7 to FIG. 9, when the second rail 44 of the first slide rail assembly 24 is displaced relative to the first rail 42 from the retracted position R in an opening direction D1, the first working member 70 of the first working device 50 is configured to abut against the first auxiliary feature 54 to drive the locking member 30 to move from the first predetermined position P1 to a second predetermined position P2, and the first predetermined track 72 of the first working device 50 is configured to support the first auxiliary feature 54 to maintain the locking member 30 at the second predetermined position P2 (as shown in FIG. 7 and FIG. 8).

Preferably, as shown in FIG. 7, when the second rail 44 and the third rail 45 of the first slide rail assembly 24 are synchronously displaced relative to the first rail 42 from the retracted position R to an extended position E in the opening direction D1, both the front end 44*a* of the second rail 44 and the front end 45*a* of the third rail 45 of the first slide rail assembly 24 protrude out of the front end 42*a* of the first rail 42 by a predetermined distance X. During the aforementioned process, as shown in FIG. 8, the first guiding section 96 of the first portion 74 of the first working member 70 of the first working device 50 abuts against the rolling portion 64 of the first auxiliary feature 54 to guide the rolling portion 64 of the first auxiliary feature 54 to rotatably move along the first guiding path K1 in a predetermined direction M to enter into the first supporting path J1 from a lower position to a higher position 104, so as to drive the locking member 30 to move from the first predetermined position P1 to the second predetermined position P2 in a first height direction H1, and the first predetermined track 72 of the first working device 50 is configured to support the rolling portion 64 of the first auxiliary feature 54 moving into the first supporting path J1 from the first guiding path K1 for maintaining the locking member 30 at the second predetermined position P2.

As shown in FIG. 9, a second working member 106 of the second working device 88 includes a first portion 108 and a second portion 110. A second guiding path K2 is formed between the first portion 108 and the second portion 110 of the second working member 106 and communicated with a second supporting path J2 formed on a second predetermined track 112 of the second working device 88. When the locking member 30 is located at the second predetermined position P2, the rolling portion 94 of the second auxiliary feature 90 is configured to block the second portion 110 of the second working member 106 for preventing the second rail 84 of the second slide rail assembly 26 from displacing relative to the first rail 86 from the retracted position R in the opening direction D1 (as shown in FIG. 7 and FIG. 9), thereby achieving the locking of the second rail 84 of the second slide rail assembly 26.

Identical to the second rail 44 and the third rail 45 of the first slide rail assembly 24, the second rail 84 and the third rail 85 of the second slide rail assembly 26 can displace synchronously relative to the first rail 86 by an engagement of corresponding predetermined features. Accordingly, when the locking member 30 is located at the second predetermined position P2, the rolling portion 94 of the second auxiliary feature 90 blocking the second portion 110 of the second working member 106 of the second working device 88 on the second rail 84 prevents both the third rail 85 and the second rail 84 of the second slide rail assembly 26 from displacing relative to the first rail 86 from the retracted position R in the opening direction D1, thereby achieving the locking of both the second rail 84 and the third rail 85 of the second slide rail assembly 26.

Figure 10:
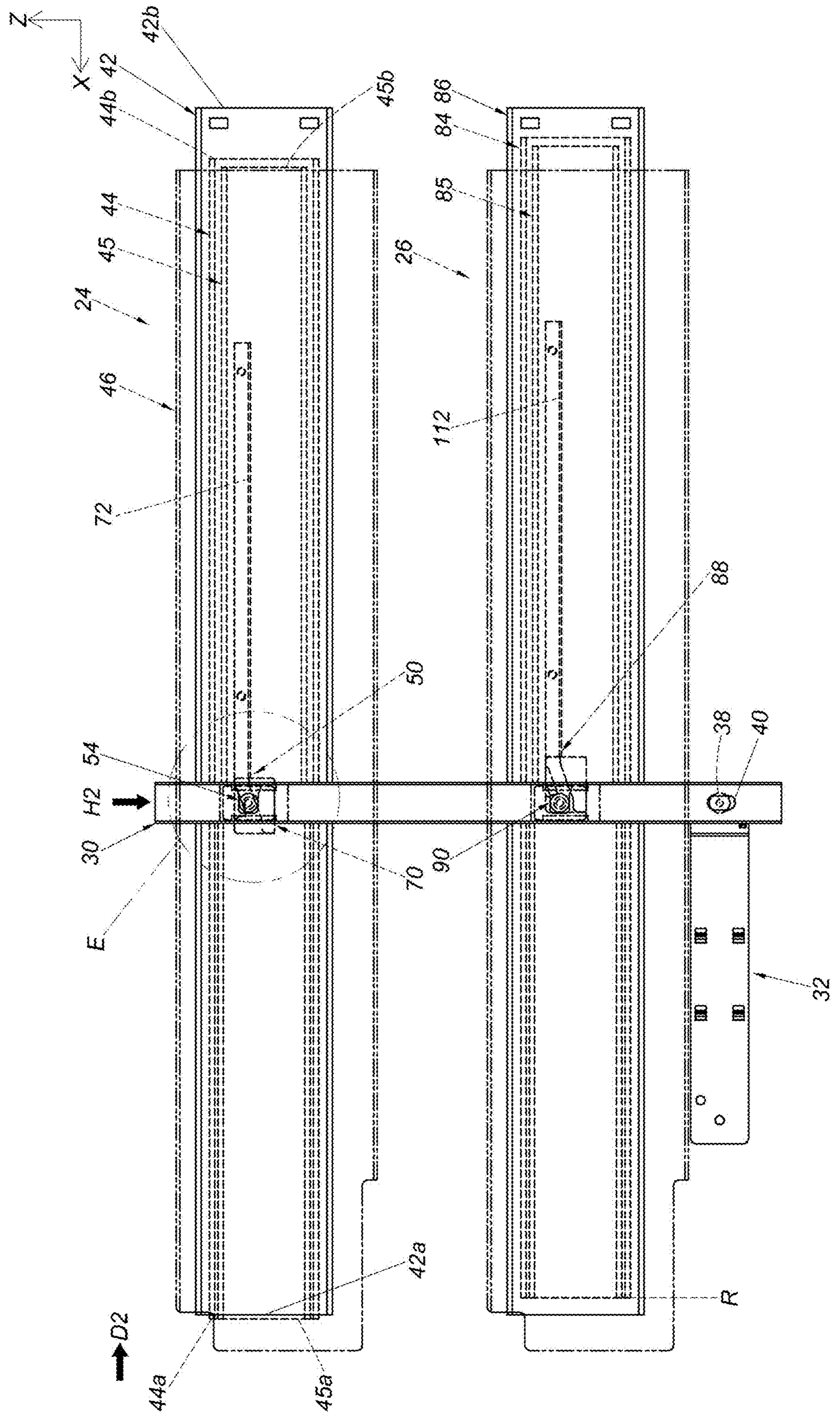
FIG. 10 is a diagram of the slide rail mechanism with the second rail of the first slide rail assembly displaced in a retracting direction and the locking member at an intermediate position between the first predetermined position and the second predetermined position according to the first embodiment of the present invention.
Figure 11:
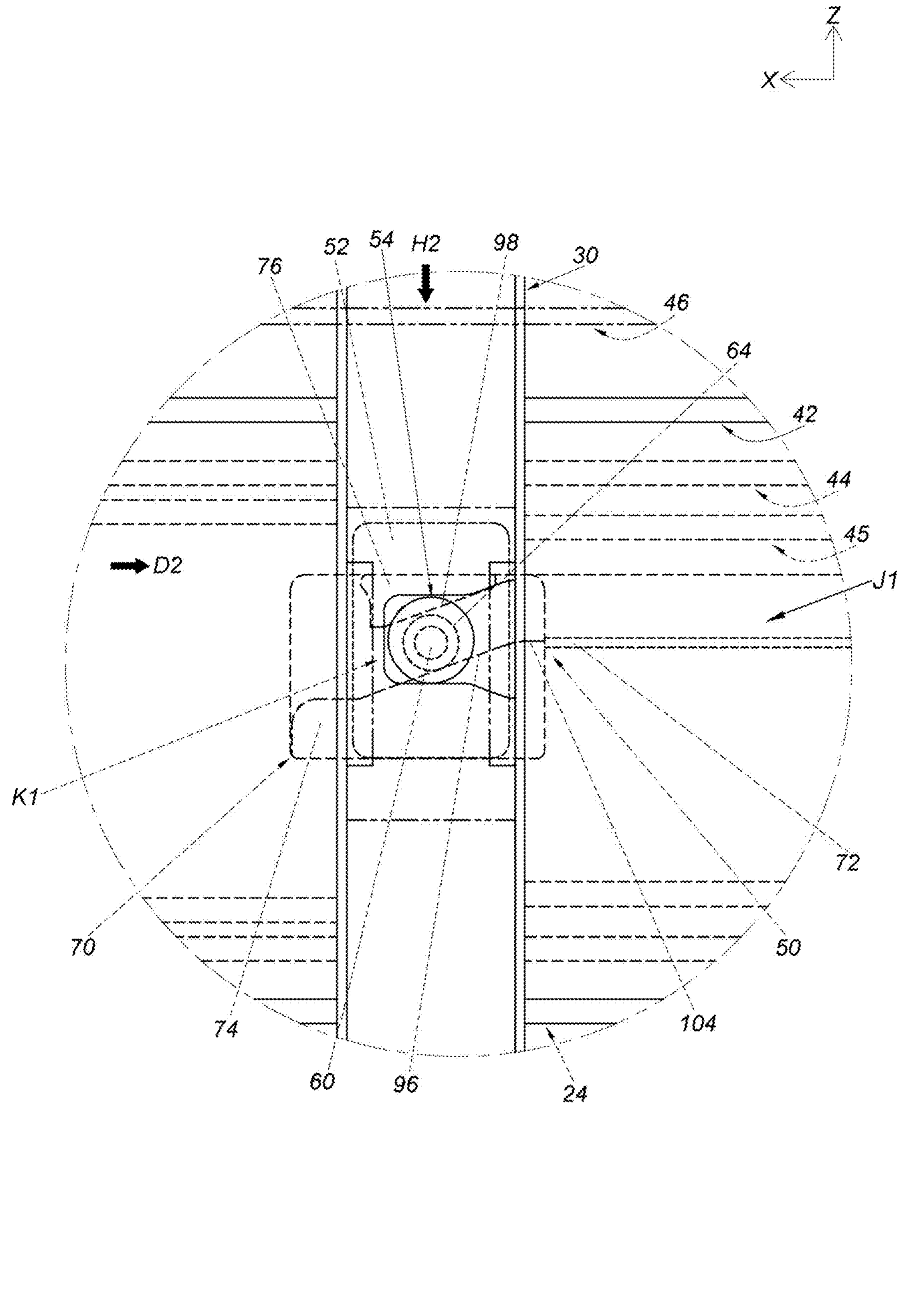
FIG. 11 is an enlarged diagram of an E portion of the slide rail mechanism shown in FIG. 10 according to the first embodiment of the present invention.

As shown in FIG. 10 and FIG. 11, when it is desired to terminate the blocking or the locking of the second rail 84 and the third rail 85 of the second slide rail assembly 26, the second rail 44 of the first slide rail assembly 24 can be displaced from the extended position E in a retracting direction D2 to drive the locking member 30 to move from the second predetermined position P2 back to the first predetermined position P1 for preventing the second rail 84 of the second slide rail assembly 26 from being blocked or locked by the rolling portion 94 of the second auxiliary feature 90 on the locking member 30.

For example, when the second rail 44 and the third rail 45 of the first slide rail assembly 24 are displaced from the extended position E in the retracting direction D2, the second guiding section 98 of the second portion 76 of the first working member 70 of the first working device 50 can abut against the rolling portion 64 of the first auxiliary feature 54 to drive the locking member 30 to move from the second predetermined position P2 in a second height direction H2 opposite to the first height direction H1. When the second rail 44 and the third rail 45 of the first slide rail assembly 24 are displaced from the extended position E in the retracting direction D2 and reach the retracted position R, the locking member 30 moving back to the first predetermined position P1 prevents the second portion 110 of the second working member 106 of the second working device 88 from being blocked by the rolling portion 94 of the second auxiliary feature 90 on the locking member 30 for allowing the second rail 84 and the third rail 85 of the second slide rail assembly 26 to displace relative to the first rail 86 from the retracted position R in the opening direction D1.

It should be noticed that, identical to the first working member 70, when the second rail 84 of the second slide rail assembly 26 is displaced relative to the first rail 86 from the retracted position R in the opening direction D1, the second working member 106 of the second working device 88 is configured to abut against the second auxiliary feature 90 to drive the locking member 30 to move from the first predetermined position P1 to the second predetermined position P2, and the second predetermined track 112 of the second working device 88 is configured to support the rolling portion 94 of the second auxiliary feature 90 on the locking member 30 to maintain the locking member 30 at the second predetermined position P2. When the locking member 30 is located at the second predetermined position P2, the rolling portion 64 of the first auxiliary feature 54 is configured to block the second portion 76 of the first working member 70 of the first working device 50 for preventing the second rail 44 of the first slide rail assembly 24 from displacing relative to the first rail 42 from the retracted position R in the opening direction D1, thereby achieving the locking of the second rail 44 of the first slide rail assembly 24.

Besides, identical to the first slide rail assembly 24 and the first auxiliary feature 54, the first rail 86 of the second slide rail assembly 26 includes a second space. For example, the second space can be an extending hole oriented parallel to the height direction and configured to allow the second auxiliary feature 90 to pass therethrough, thereby enabling the second auxiliary feature 90 to cooperate with the second working device 88 arranged on the second rail 84 of the second slide rail assembly 26.

Figure 12:
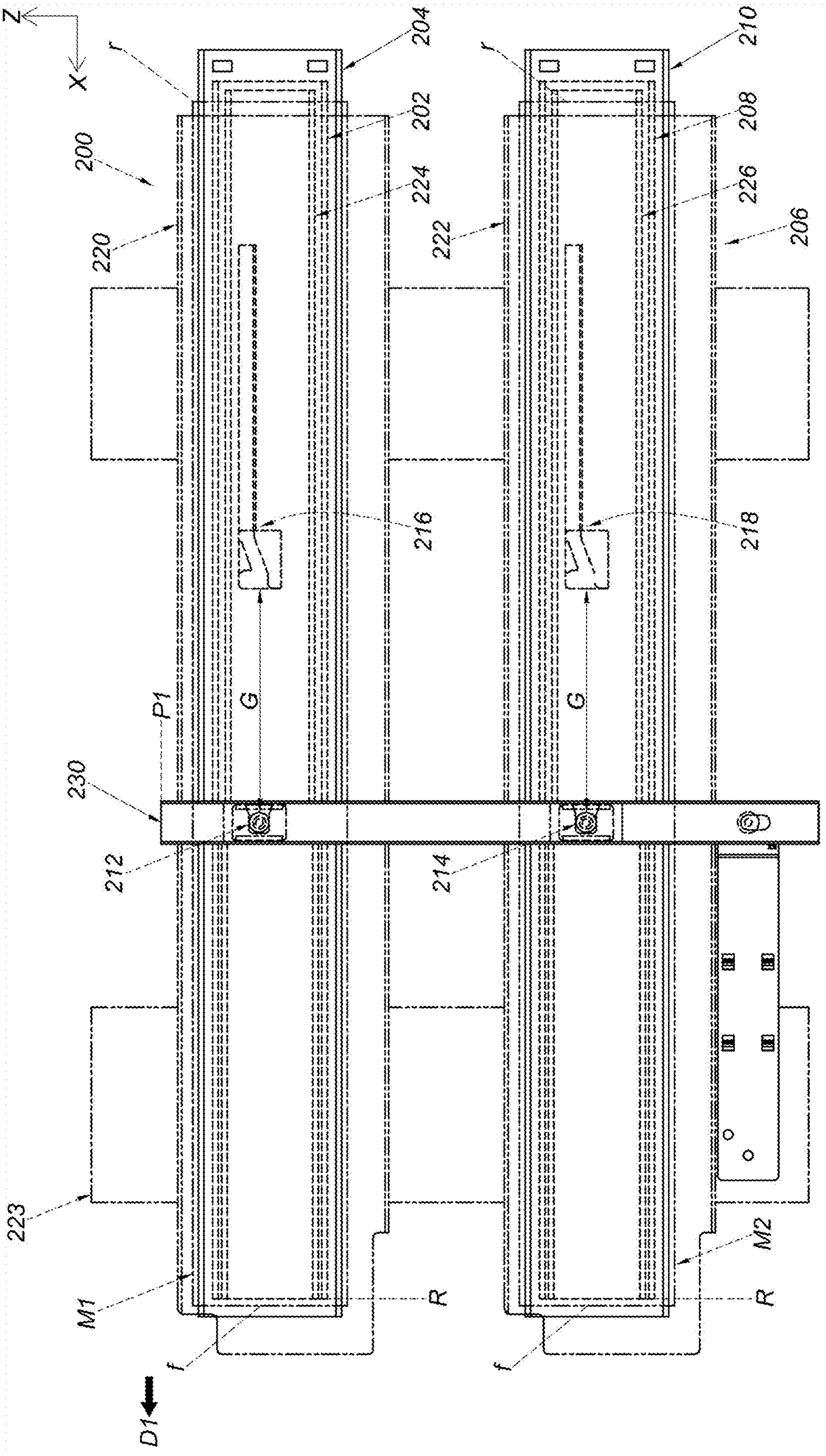
FIG. 12 is a diagram of a slide rail mechanism with a first slide rail assembly mounted on a rack and supporting a first electronic apparatus, a second slide rail assembly mounted on the rack and supporting a second electronic apparatus, and a locking member at a first predetermined position according to a second embodiment of the present invention.

As shown in FIG. 12, different from the first embodiment, in a second embodiment, when a second rail 202 of a first slide rail assembly 200 and a second rail 208 of a second slide rail assembly 206 are located at the retracted position R relative to a first rail 204 of the first slide rail assembly 200 and a first rail 210 of the second slide rail assembly 206, respectively, a first auxiliary feature 212 and a second auxiliary feature 214 are spaced apart from a first working device 216 and a second working device 218, respectively, by a predetermined distance G, e.g., a longitudinal predetermined distance.

Besides, identical to the first embodiment, the first rail 204 of the first slide rail assembly 200 and the first rail 210 of the second slide rail assembly 206 are configured to be mounted on a rack 223 by a first bracket 220 and a second bracket 222, respectively. Furthermore, a third rail 224 of the first slide rail assembly 200 and a third rail 226 of the second slide rail assembly 206 are configured to carry a first electronic apparatus M1 and a second electronic apparatus M2, respectively. In other words, the second rail 202 of the first slide rail assembly 200 and the second rail 208 of the second slide rail assembly 206 are configured to support the first electronic apparatus M1 and the second electronic apparatus M2, respectively. More specifically, the third rail 224 of the first slide rail assembly 200 and the third rail 226 of the second slide rail assembly 206 can be, for example, inner rails configured to directly support the first electronic apparatus M1 and the second electronic apparatus M2, respectively, and the second rail 202 of the first slide rail assembly 200 and the second rail 208 of the second slide rail assembly 206 can be, for example, middle rails configured to indirectly support the first electronic apparatus M1 and the second electronic apparatus M2, respectively.

The first electronic apparatus M1 and the second electronic apparatus M2 can be, for example, servers or electronic devices including a plurality of electronic modules. Additionally, identical to the first embodiment, the third rail 224 and the second rail 202 of the first slide rail assembly 200 can be displaced synchronously by an engagement of corresponding predetermined features, and the third rail 226 and the second rail 208 of the second slide rail assembly 206 can be displaced synchronously by an engagement of corresponding predetermined features. Moreover, each of the first electronic apparatus M1 and the second electronic apparatus M2 includes a first end portion and a second end portion opposite to the first end portion. In this embodiment, by way of example, the first end portion and the second end portion of each of the first electronic apparatus M1 and the second electronic apparatus M2 can be a front end portion f and a rear end portion r of each of the first electronic apparatus M1 and the second electronic apparatus M2.

Figure 13:
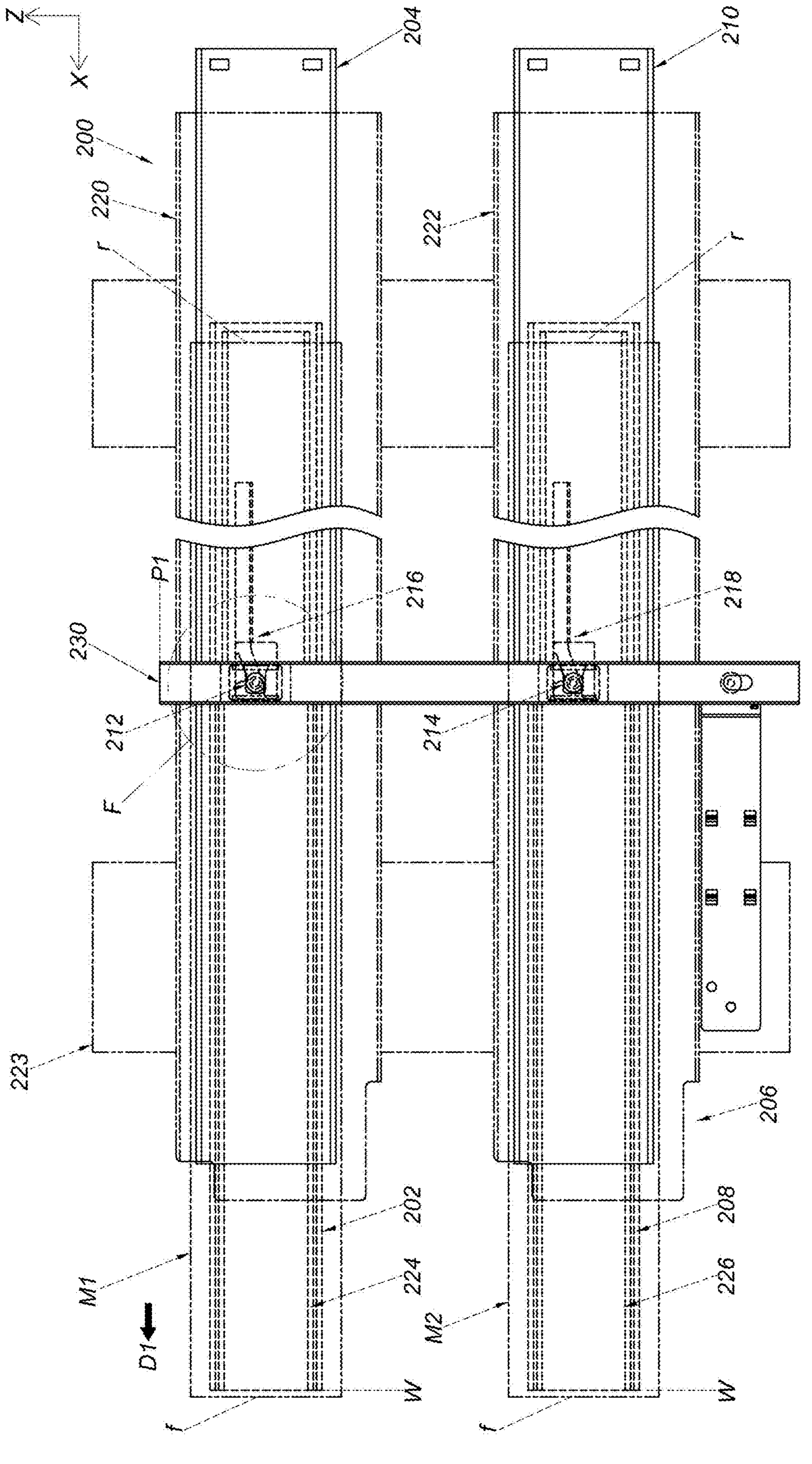
FIG. 13 is a diagram of the slide rail mechanism with a second rail of the first slide rail assembly and a second rail of the first slide rail assembly displaced relative to the corresponding first rails, respectively, by a predetermined distance in an opening direction according to the second embodiment of the present invention.
Figure 14:
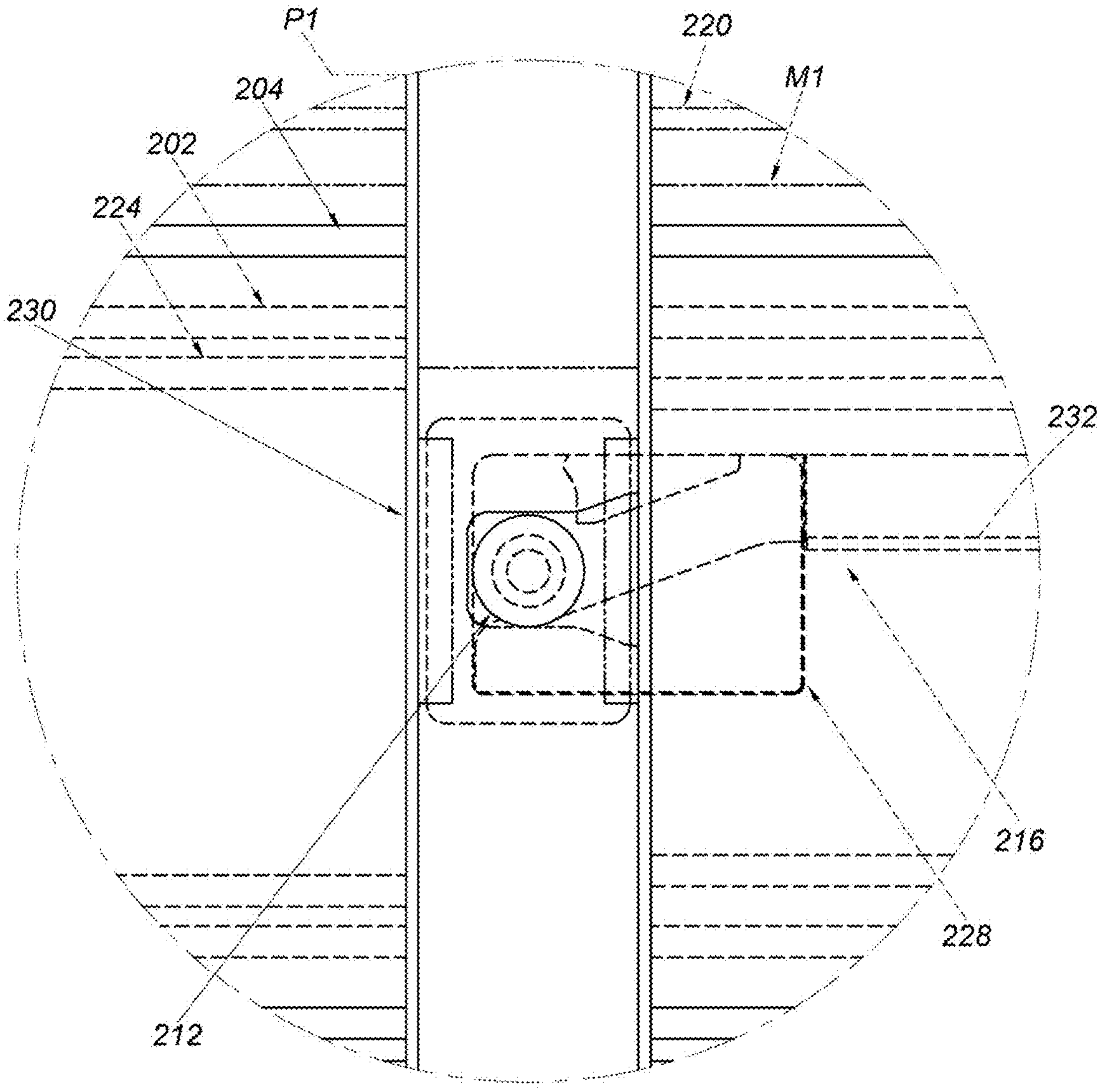
FIG. 14 is an enlarged diagram of an F portion of the slide rail mechanism shown in FIG. 13 according to the second embodiment of the present invention.

As shown in FIG. 13 and FIG. 14, the second rail 202 and the third rail 224 of the first slide rail assembly 200 are synchronously displaceable relative to the first rail 204 of the first slide rail assembly 200 in the opening direction D1 from the retracted position R to a working position W by the predetermined distance G for easy maintenance of an object located adjacent to the rear end portion r of the first electronic apparatus M1, and the second rail 208 and the third rail 226 of the second slide rail assembly 206 are also synchronously displaceable relative to the first rail 210 of the second slide rail assembly 206 in the opening direction D1 from the retracted position R to the working position W by the predetermined distance G for easy maintenance of an object located adjacent to the rear end portion r of the second electronic apparatus M2. For example, each of the rear end portion r of the first electronic apparatus M1 and the rear end portion r of the second electronic apparatus M2 can be provided with a predetermined device for heat dissipation. When the second rail 202 and the third rail 224 of the first slide rail assembly 200 are synchronously displaced in the opening direction D1 and reach the working position W, it is easy for a user to conduct maintenance of the predetermined device located adjacent to the rear end portion r of the first electronic apparatus M1. When the second rail 208 and the third rail 226 of the second slide rail assembly 206 are synchronously displaced in the opening direction D1 and reach the working position W, it is easy for the user to conduct maintenance of the predetermined device located adjacent to the rear end portion r of the second electronic apparatus M2. However, the present invention is not limited to this embodiment. The second rail and the third rail of any of the slide rail assemblies can be synchronously displaced to the working position for other purposes.

Figure 15:
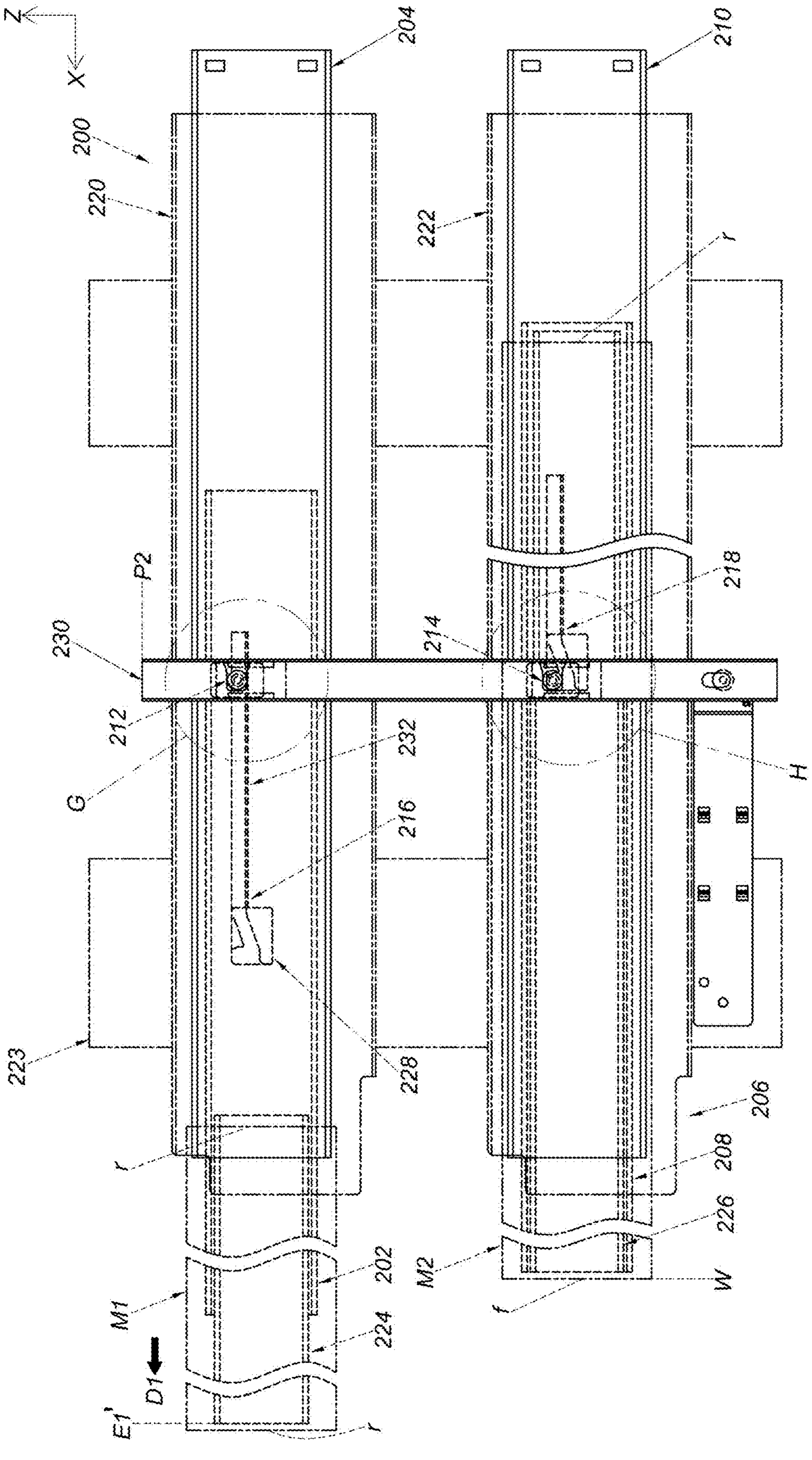
FIG. 15 is a diagram of the slide rail mechanism with the second rail of the first slide rail assembly at a fully extended position relative to the corresponding first rail and the second rail of the second slide rail assembly at the working position relative to the corresponding first rail according to the second embodiment of the present invention.
Figure 16:
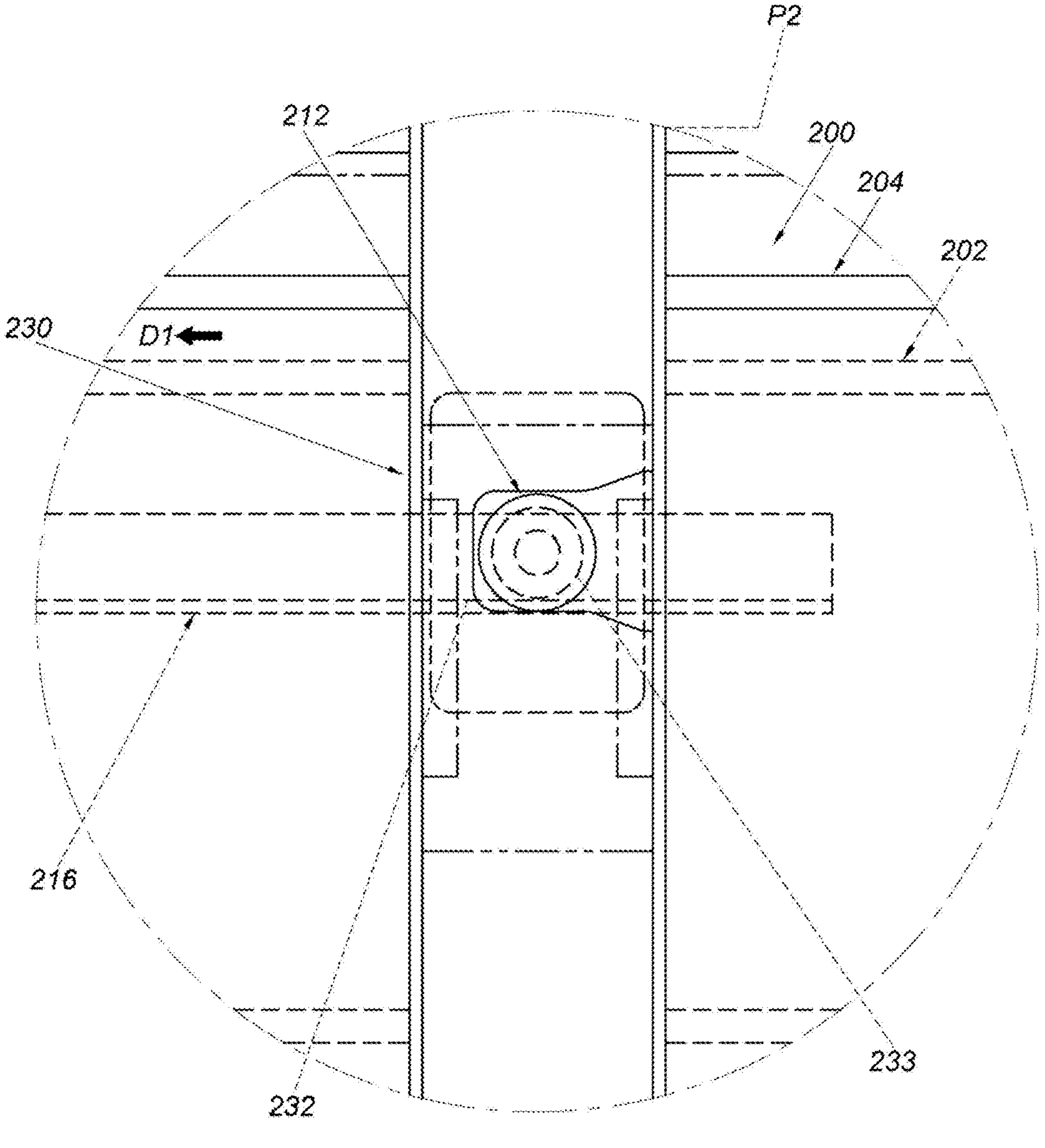
FIG. 16 is an enlarged diagram of a G portion of the slide rail mechanism shown in FIG. 15 according to the second embodiment of the present invention.

As shown in FIG. 13 to FIG. 16, when the second rail 202 of the first slide rail assembly 200 is displaced relative to the first rail 204 from the working position W (as shown in FIG. 13 and FIG. 14) in the opening direction D1, a first working member 228 of the first working device 216 is configured to abut against the first auxiliary feature 212, e.g., a rolling portion 233 of the first auxiliary feature 212, to drive a locking member 230 to move from the first predetermined position P1 to the second predetermined position P2, and a first predetermined track 232 of the first working device 216 is configured to support the first auxiliary feature 212, e.g., the rolling portion 233 of the first auxiliary feature 212, to maintain the locking member 230 at the second predetermined position P2 (as shown in FIG. 15 and FIG. 16). Preferably, when the second rail 202 of the first slide rail assembly 200 is displaced relative to the first rail 204 from the working position W in the opening direction D1, a disengaging structure on the first rail 204 of the first slide rail assembly 200 is configured to terminate a synchronous displacement of the third rail 224 and the second rail 202 of the first slide rail assembly 204, so as to allow the third rail 224 and the second rail 202 to be displaced relative to the first rail 204 individually thereby allowing the third rail 224 to reach a fully extended position E', i.e., allowing the first slide rail assembly 200 to be in a fully extended state (as shown in FIG. 15).

Figure 17:
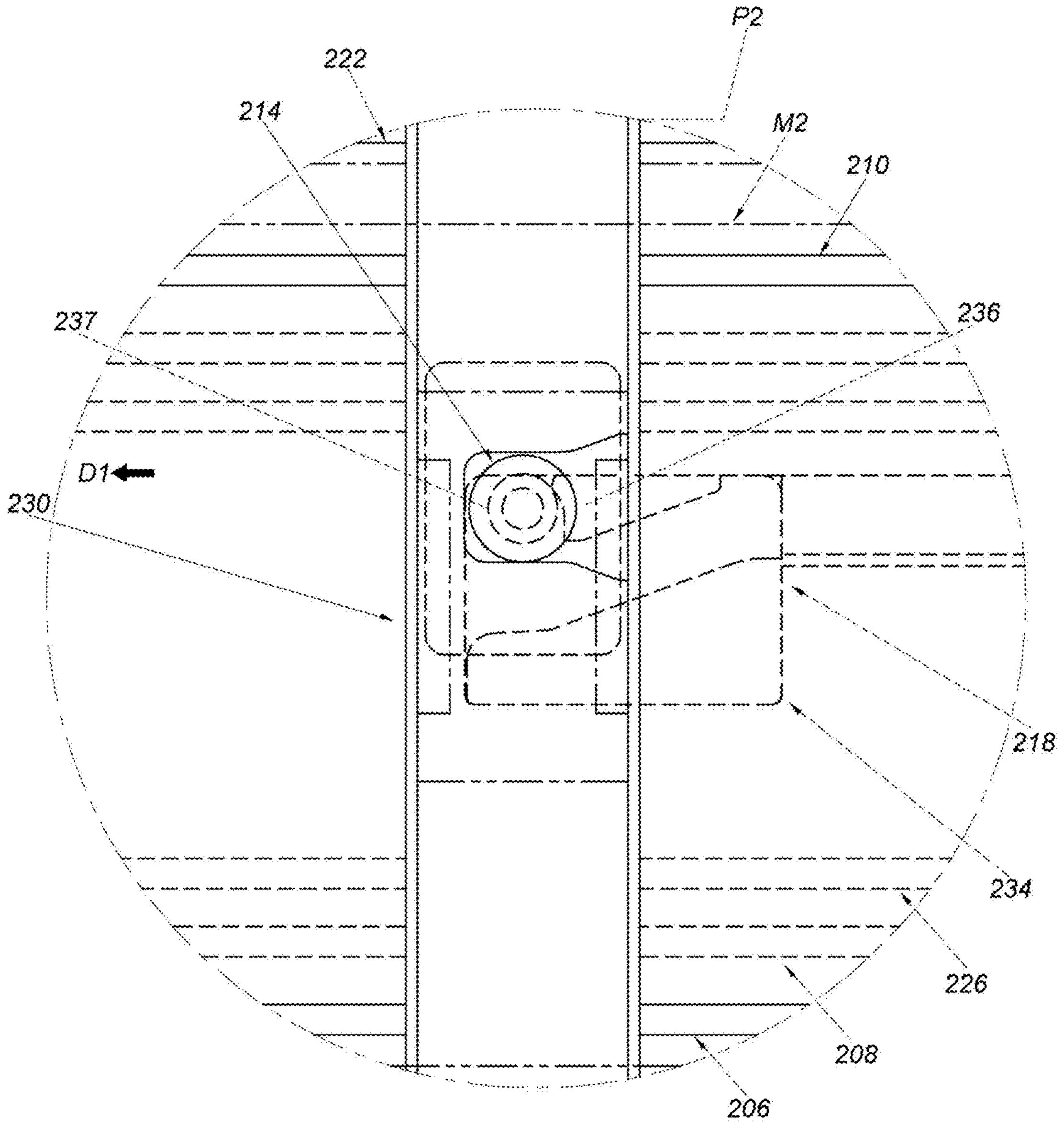
FIG. 17 is an enlarged diagram of an H portion of the slide rail mechanism shown in FIG. 15 according to the second embodiment of the present invention.

As shown in FIG. 15 and FIG. 17, when the locking member 230 is located at the second predetermined position P2, the second auxiliary feature 214, e.g., a rolling portion 237 of the second auxiliary feature 214, is configured to block a second working member 234, e.g., a second portion 236 of the second working member 234, of the second working device 218, to prevent the second rail 208 of the second slide rail assembly 206 from displacing relative to the first rail 210 from the working position W to the fully extended position in the opening direction D1. Understandably, the working position W is a position between the retracted position R and the fully extended position.

It should be noticed that, different from the first embodiment, in the second embodiment, the second rail 202 of the first slide rail assembly 200 displacing relative to the first rail 204 in the opening direction D1, is configured to drive the locking member 230 to move from the first predetermined position P1 to the second predetermined position P2 to prevent the second rail 208 of the second slide rail assembly 206 from displacing relative to the first rail 210 in the opening direction D1 from the working position W instead of the retraced position R.

Other details of the second embodiment are identical to the ones of the first embodiment. Detailed description is omitted herein for simplicity.

From the above, the present invention includes the following characteristics.

1. In the second embodiment, both the second rail 202 of the first slide rail assembly 200 and the second rail 208 of the second slide rail assembly 206 are displaceable to the working position W from the retraced position R in the opening direction D1 by the predetermined distance G to allow the user to conduct maintenance of objects located adjacent to a rear end of the second rail 202, a rear end of the second rail 208, the rear end portion of the first electronic apparatus M1 and the rear end portion of the second electronic apparatus M2. Furthermore, when one of the second rail 202 of the first slide rail assembly 200 and the second rail 208 of the second slide rail assembly 206 is displaced in the opening direction D1 from the working position W to drive the locking member 230 to move from the first predetermined position P1 to the second predetermined position P2, the other one of the second rail 202 of the first slide rail assembly 200 and the second rail 208 of the second slide rail assembly 206 is prevented from displacing in the opening direction D1 from the working position W, thereby offering an interlock function that provides a balance between easy maintenance and enhanced safety.

2. In the first embodiment, when one of the second rail 44 of the first slide rail assembly 24 and the second rail 84 of the second slide rail assembly 26 is displaced in the opening direction D1 to drive the locking member 30 to move from the first predetermined position P1 to the second predetermined position P2, the other one of the second rail 44 of the first slide rail assembly 24 and the second rail 84 of the second slide rail assembly 26 is prevented from displacing in the opening direction D1, thereby offering an interlock function.

3. The rolling portion 64 on the first auxiliary feature 54 on the locking member 30 is configured to rotatably abut against the first guiding section 96 of the first portion 74 of the first working member 70 and the first predetermined track 72 of the first working device 50 to prevent wear damage of the first portion 74 of the first working member 70 and the first predetermined track 72 of the first working device 50, thereby enhancing reliability of the interlock function of the slide rail mechanism.

4. The first predetermined track 72 of the first working device 50 and the second predetermined track 112 of the second working device 88 are arranged on the first side L1' of the second rail 44 of the first slide rail assembly 24 and the first side of the second rail 84 of the second slide rail assembly 26, respectively, and the first predetermined track 72 of the first working device 50 and the second predetermined track 112 of the second working device 88 are configured to cooperate with the rolling portion 64 of the first auxiliary feature 54 and the rolling portion 94 of the second auxiliary feature 90 on the locking member 30, respectively. Therefore, it is not required to dispose any additional accessory or structure on the corresponding slide rail assembly to accommodate the corresponding predetermined track, e.g., the first predetermined track 72 and the second predetermined track 112.

5. The locking member 30 is detachably mounted on the rack 22, and a position of the locking member 30 relative to the rack 22 is adjustable according to practical demands to enable the locking member 30 to be movable relative to the rack 22 and the first rail of each of the first slide rail assembly 24, the second slide rail assembly 26 and the third slide rail assembly 28 in the first height direction H1 or the second height direction H2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail mechanism comprising:
- a first slide rail assembly;
- a second slide rail assembly, each of the first slide rail assembly and the second slide rail assembly comprising a first rail and a second rail displaceable relative to the first rail;
- a first working device arranged on the second rail of the first slide rail assembly, the first working device comprising a first working member and a first predetermined track;
- a second working device arranged on the second rail of the second slide rail assembly, the second working device comprising a second working member and a second predetermined track;
- a locking member movable relative to the first rail of each of the first slide rail assembly and the second slide rail assembly;
- a first auxiliary feature arranged on the locking member; and
- a second auxiliary feature arranged on the locking member;
- wherein when the second rail of each of the first slide rail assembly and the second slide rail assembly is located at a retracted position relative to the first rail of each of the first slide rail assembly and the second slide rail assembly, the first auxiliary feature and the second auxiliary feature are spaced apart from the first working device and the second working device, respectively, by a predetermined distance;
- wherein the second rail of each of the first slide rail assembly and the second slide rail assembly is displaceable from the retracted position to a working position by the predetermined distance relative to the first rail of each of the first slide rail assembly and the second slide rail assembly in an opening direction;
- wherein when the second rail of the first slide rail assembly is displaced from the working position relative to the first rail of the first slide rail assembly in the opening direction, the first working member of the first working device is configured to abut against the first auxiliary feature for driving the locking member to move from a first predetermined position to a second predetermined position, and the first predetermined track of the first working device is configured to support the locking member for maintaining the locking member at the second predetermined position;
- wherein when the locking member is located at the second predetermined position, the second auxiliary feature is configured to block the second working member to prevent the second rail of the second slide rail assembly from displacing from the working position relative to the first rail of the second slide rail assembly in the opening direction;
- wherein each of the first working member and the second working member comprises a first portion and a second portion, a first guiding path is formed between the first portion and the second portion of the first working member and communicated with a first supporting path formed on the first predetermined track, and a second guiding path is formed between the first portion and the second portion of the second working member and communicated with a second supporting path formed on the second predetermined track.

2. The slide rail mechanism of claim 1, wherein each of the first slide rail assembly and the second slide rail assembly further comprises a third rail, and the second rail of each of the first slide rail assembly and the second slide rail assembly is movably mounted between the first rail and the third rail of each of the first slide rail assembly and the second slide rail assembly.

3. The slide rail mechanism of claim 2, wherein the second rail of each of the first slide rail assembly and the second slide rail assembly comprises a first side and a second side opposite to the first side, the first side and the second side of the second rail of each of the first slide rail assembly and the second slide rail assembly face toward the first rail and the third rail of each of the first slide rail assembly and the second slide rail assembly, respectively, the first working device is arranged on the first side of the second rail of the first slide rail assembly, and the second working device is arranged on the first side of the second rail of the second slide rail assembly.

4. The slide rail mechanism of claim 2, wherein the second rail of each of the first slide rail assembly and the second slide rail assembly comprises a first predetermined feature, the third rail of each of the first slide rail assembly and the second slide rail assembly comprises a second predetermined feature, and the first predetermined feature is configured to engage with the corresponding second predetermined feature to drive the corresponding third rail to displace synchronously with the corresponding second rail.

5. The slide rail mechanism of claim 1, wherein the first predetermined track is oriented parallel to a length direction of the second rail of the first slide rail assembly, and the second predetermined track is oriented parallel to a length direction of the second rail of the second slide rail assembly.

6. The slide rail mechanism of claim 1, wherein the first portion of each of the first working member and the second working member comprises a first guiding section, the second portion of each of the first working member and the second working member comprises a second guiding section facing toward the first guiding section of each of the first working member and the second working member, the first guiding path is formed between the first guiding section of the first portion and the second guiding section of the second portion of the first working member, and the second guiding path is formed between the first guiding section of the first portion and the second guiding section of the second portion of the second working member.

7. The slide rail mechanism of claim 1, wherein when the second rail of the first slide rail assembly is displaced relative to the first rail of the first slide rail assembly in the opening direction, the first portion of the first working member of the first working device is configured to abut against the first auxiliary feature to guide the first auxiliary feature to move along the first guiding path for driving the locking member to move from the first predetermined position to the second predetermined position in a height direction, and the first predetermined track of the first working device is configured to support the first auxiliary feature moving into the first supporting path from the first guiding path for maintaining the locking member at the second predetermined position.

8. The slide rail mechanism of claim 7, wherein when the second rail of the first slide rail assembly is displaced relative to the first rail of the first slide rail assembly in the opening direction, the first portion of the first working member of the first working device is configured to abut against a rolling portion of the first auxiliary feature to guide the rolling portion of the first auxiliary feature to move along the first guiding path for driving the locking member to move from the first predetermined position to the second predetermined position in the height direction, and the first predetermined track of the first working device is configured to support the rolling portion of the first auxiliary feature moving into the first supporting path from the first guiding path for maintaining the locking member at the second predetermined position.

9. The slide rail mechanism of claim 1, wherein the first rail of the first slide rail assembly comprises a first space for allowing the first auxiliary feature to pass therethrough, thereby enabling the first working member to cooperate with the first auxiliary feature.

10. The slide rail mechanism of claim 9, wherein the first rail of the second slide rail assembly comprises a second space for allowing the second auxiliary feature to pass therethrough, thereby enabling the second working member to cooperate with the second auxiliary feature.

11. A slide rail mechanism adapted for a rack, the slide rail mechanism comprising:

a first slide rail assembly configured to be mounted on the rack;

a second slide rail assembly configured to be mounted on the rack, each of the first slide rail assembly and the second slide rail assembly comprising a first rail and a second rail displaceable relative to the first rail, the second rail of each of the first slide rail assembly and the second slide rail assembly being configured to support an electronic apparatus;

a first working device arranged on the second rail of the first slide rail assembly, the first working device comprising a first working member and a first predetermined track oriented parallel to a length direction of the second rail of the first slide rail assembly;

a second working device arranged on the second rail of the second slide rail assembly, the second working device comprising a second working member and a second predetermined track oriented parallel to a length direction of the second rail of the second slide rail assembly;

a locking member movable relative to the rack;

a first auxiliary feature arranged on the locking member; and a second auxiliary feature arranged on the locking member;

wherein when the second rail of each of the first slide rail assembly and the second slide rail assembly is located at a retracted position relative to the first rail of each of the first slide rail assembly and the second slide rail assembly, the first auxiliary feature and the second auxiliary feature are spaced apart from the first working device and the second working device, respectively, by a predetermined distance;

wherein the second rail of each of the first slide rail assembly and the second slide rail assembly is displaceable from the retracted position to a working position by the predetermined distance relative to the first rail of each of the first slide rail assembly and the second slide rail assembly in an opening direction;

wherein when the second rail of the first slide rail assembly is displaced from the working position relative to the first rail of the first slide rail assembly in the opening direction, the first working member of the first working device is configured to abut against the first auxiliary feature for driving the locking member to move from a first predetermined position to a second predetermined position;

wherein when the locking member is located at the second predetermined position, the second auxiliary feature is configured to block the second working member to prevent the second rail of the second slide rail assembly from displacing from the working position relative to the first rail of the second slide rail assembly in the opening direction;

wherein each of the first working member and the second working member comprises a first portion and a second portion, a first guiding path is formed between the first portion and the second portion of the first working member and communicated with a first supporting path formed on the first predetermined track, and a second guiding path is formed between the first portion and the second portion of the second working member and communicated with a second supporting path formed on the second predetermined track.

12. The slide rail mechanism of claim 11, wherein each of the first slide rail assembly and the second slide rail assembly further comprises a third rail configured to carry the electronic apparatus, the second rail of each of the first slide rail assembly and the second slide rail assembly is movably mounted between the first rail and the third rail of each of the first slide rail assembly and the second slide rail assembly and configured to support the electronic apparatus by the third rail of each of the first slide rail assembly and the second slide rail assembly, the second rail of each of the first slide rail assembly and the second slide rail assembly comprises a first side and a second side opposite to the first side, the first side of the second rail of each of the first slide rail assembly and the second slide rail assembly faces toward the first rail of each of the first slide rail assembly and the second slide rail assembly, the first working device is arranged on the first side of the second rail of the first slide rail assembly, and the second working device is arranged on the first side of the second rail of the second slide rail assembly.

13. The slide rail mechanism of claim 12, wherein the second rail of each of the first slide rail assembly and the second slide rail assembly comprises a first predetermined feature, the third rail of each of the first slide rail assembly and the second slide rail assembly comprises a second predetermined feature, and the first predetermined feature is configured to engage with the corresponding second predetermined feature to drive the corresponding third rail to displace synchronously with the corresponding second rail.

14. The slide rail mechanism of claim 11, wherein the first portion of each of the first working member and the second working member comprises a first guiding section.

15. The slide rail mechanism of claim 11, wherein when the second rail of the first slide rail assembly is displaced relative to the first rail of the first slide rail assembly in the opening direction, the first portion of the first working member of the first working device is configured to abut against the first auxiliary feature to guide the first auxiliary feature to move along the first guiding path for driving the locking member to move from the first predetermined position to the second predetermined position in a height direction, and the first predetermined track of the first working device is configured to support the first auxiliary feature moving into the first supporting path from the first guiding path for maintaining the locking member at the second predetermined position.

16. The slide rail mechanism of claim 11, wherein the first rail of the first slide rail assembly comprises a first space for allowing the first auxiliary feature to pass therethrough, thereby enabling the first working member to cooperate with the first auxiliary feature.

17. The slide rail mechanism of claim 16, wherein the first rail of the second slide rail assembly comprises a second space for allowing the second auxiliary feature to pass therethrough, thereby enabling the second working member to cooperate with the second auxiliary feature.

* * * * *